US006183817B1

(12) United States Patent
Gersonde

(10) Patent No.: US 6,183,817 B1
(45) Date of Patent: Feb. 6, 2001

(54) METHOD AND APPARATUS FOR DIRECT WRITE FABRICATION OF NANOSTRUCTURES

(76) Inventor: Michael S. Gersonde, 683 San Juan Dr. Suite 2, Sunnyvale, CA (US) 94086-3330

( * ) Notice: Under 35 U.S.C. 154(b), the term of this patent shall be extended for 0 days.

(21) Appl. No.: 09/086,005

(22) Filed: May 27, 1998

Related U.S. Application Data

(60) Provisional application No. 60/047,908, filed on May 29, 1997.

(51) Int. Cl.[7] .............................. G21K 1/02; G21K 1/00; H01S 1/06

(52) U.S. Cl. .......................... 427/561; 427/595; 427/596; 427/597; 250/251; 250/492.22

(58) Field of Search ..................................... 427/561, 595, 427/596, 597; 250/251, 492.1, 492.22

(56) References Cited

U.S. PATENT DOCUMENTS 3,558,877 * 1/1971 Pressman ............................ 250/251
4,386,274 * 5/1983 Alshuler .............................. 250/251
5,126,565 * 6/1992 Rose .................................... 250/305
5,360,764 * 11/1994 Celotta et al. ....................... 437/173
5,834,769 * 11/1998 Fujita et al. ......................... 250/251

OTHER PUBLICATIONS

Scholten et al, "Nanostructure Fabrication Via Direct Writing With Atoms Focused In Laser Fields", *J. Vac. Sci. Technol.* B 12(3), pp. 1847–1850, May/Jun. 1994.*

Drodofsky et al, "Nanometerscale Lithography With Chromium Atoms Using Light Forces", *Microelectronic Engineering* vol. 35 pp. 285–288, Feb. 1997.*

Renn et al, "Particle Manipulation And Surface Patterning By Laser Guidance", *J. Vac. Sci. Technol.* B 16(6), pp. 3859–3863, Nov./Dec. 1998.*

Harkness et al, "Boundary Effects in Large Aspect Ratio Lasers", *Proceedings of the 5th European Quantum Electronics Conference* (EQEC '94) p. 5 (QMBI 0900), no month 1994.*

Cognet et al., "Atomic Interference in Grazing Incidence Deffraction From an Evanescent Wave Mirror", *Phys. Rev. Letters*, vol. 81, No. 23, pp. 5044–5047, Dec. 7, 1998.*

Averbukh et al, "Quantum Lens For Atomic Waves" *IQEC '94*vol. 9, 1994 *Techniquical Digest Series Conference Edition*, Optical Society of America p. 94, May 8–13, 1994.*

Gallatin et al, "Laser Focusing of Atomic Beams", *J. Opt. Soc. Am.* B vol. 8, No. 3, pp. 502–508, Mar. 1991.*

(List continued on next page.)

*Primary Examiner*—Marianne Padgett
(74) *Attorney, Agent, or Firm*—James J. Leary; Carol D. Titus; Patrick T. Reilly

(57) ABSTRACT

A method and apparatus to fabricate nano-device and semiconductor device structures and features by controlling a coherent or near coherent particle beam to directly deposit, or direct write, onto a preselected deposition site of a substrate and into a predetermined shape is provided. Evanescent wave plates are optionally included to increase the order of the particle beam prior to interaction with a photonic lens. The photonic lens is holographically generated by means of a source laser and an optical lens to focus the atomic beam onto the deposition site by means of Lorenz force interaction between light fields of the photonic lens and dipole moments of the atoms of the atomic beam. The diffraction pattern of the optical lens is computer calculated to precisely form the desired photonic lens in accordance with the shape and size of the desired feature or structure to be built on the substrate and the characteristics of the atomic beam, the source laser, the shape and position of the substrate and the location of the deposition site.

19 Claims, 9 Drawing Sheets

Wafer Surface Detail

Wafer Surface Detail

OTHER PUBLICATIONS

Bowden et al, "Local Field Effects in Nonlinear and Quantum Optics" Conference Proceeding LEOS '97, IEEE Lasers & Electro–Optics Soc. 1997, Annual Meeting, Part vol. 2 pp. 180–181 Nov. 1997.*

In SPEC Abstract #: A9806–4250–017, to Bowden et al, "Local Field Effects in Nonlinear & Quantum Optics"; LEOS '97, $10^{th}$ Annual Meeting, IEEE Lasers & Electro–Optics Society 1997 Annual Meeting, part vol. 2, p. 180–vol. 2, 1996 No Month.*

Natarajan et al, "High–Contrast, High Resolution Focusing of Neutral Atoms Using Light Forces"; *Phys. Rev. A*, vol. 53, No. 6, pp. 4381–4385, Jun. 1996.*

Baldwin et al.; "A Bright Metastable Helium Atomic Beam for Lithography & Atom Optics"; *Proceedings of the SPIE—The Internat. Soc. for Optical Engineering Conference*, (SPIE vol. 2995) pp. 11–20, Feb. 10–12, 1997.*

Drodofsky et al, "Nanometerscale Lithography With Chromium Atoms Using Light Forces", *Micro Electronic Engineering*, vol. 35, No. 1–4, pp. 285–288, Feb. 1997.*

Berggren et al; "Calculations of Atomic Position in Nano Meter Scale Direct–Write Optical Lithography With an Optical Standing Wave", *J. Opt. Soc. Am. B*, vol. 11, No. 7, pp. 1166–1176, Jul. 1994.*

Giltner et al., "Theoretical & Experimental Study of the Bragg Scattering of Atoms From a Standing Light Wave"; *Phy. Rev. A*, vol. 52, No. 5, pp. 3966–3972, Nov. 1995.*

J. J. McClelland and M. R. Scheinfein, "Laser focusing of atoms: a particle–optics approach", J. Opt. Soc. Am. B/vol. 8, No. 9/Sep. 1991, pp. 1974–1986.

T. Sleator, T. Pfau, V. Balykin, and J. Mlynek, "Imaging and Focusing of an Atomic Beam with a Large Period Standing Light Wave", Applied Physics B, No Month 1992, pp. 375–379.

G. Timp, R. E. Behringer, D. M. Tennant, and J. E. Cunningham, "Using Light as a Lens for Submicron, Neutral–Atom Lithography", Physical Review Letters, vol. 69, No. 11, Sep. 14, 1992, pp. 1636–1639.

J. J. McClelland, R. E. Scholten, E. C. Palm, and R. J. Celotta "Laser–Focused Atomic Deposition" Science, vol. 262, Nov. 5, 1993, pp. 877–880.

R. Kaiser, Y. Lévy, N. Vansteenkiste, A. Aspect, W. Seifert, D. Leipold and J. Mlynek "Resonant Enhancement of Evanescent Waves with a Thin Dielectric Waveguide", Optics Communications, vol. 104, No. 4, 5, 6, (Jan. 1994), pp. 234–240.

* cited by examiner

System Level Overview

REACTOR DETAIL
ATOMIC BEAM PERPENDICULAR TO WAFER

Wafer Surface Detail

Wafer Surface Detail

Diamond Layer Deposition

Output Coupler Details

Grazing Incidence Nozzle

METHOD AND APPARATUS FOR DIRECT WRITE FABRICATION OF NANOSTRUCTURES

CROSS REFERENCE TO OTHER APPLICATIONS

This application claims the benefit of U.S. Provisional patent application Ser. No. 60/047,908 filed May 29, 1997, which is hereby incorporated by reference in its entirety.

BACKGROUND OF THE INVENTION

1. Field of the Invention

The present invention relates generally to the fabrication of nano-devices and semiconductor devices. More specifically, the present invention relates to direct write fabrication and lithography techniques and systems employing the Lorenz force interactions of light fields with the dipole moment of atoms to build stable nanostructures of matter via the direct deposition of atoms upon substrates.

2. Description of the Prior Art

The nano-device and semiconductor device manufacturing communities consistently strive to develop fabrication techniques and equipment that enable the precise definition of ever smaller structural components of functional devices. These device manufacturers expend extensive financial and technological resources in the exploration and development of improved photolithography process tools and methods on a continual basis.

The potential rewards for achieving significant reduction in minimal dimension manufacturable structures, features or spot sizes, are tremendous. Smaller structural components can be used to create smaller devices. Semiconductor devices constructed with smaller feature and structure dimensions operate at faster speeds, consume less power and embody higher functional complexities. Smaller nano-devices function within finer scales of precision. The economic motivation of manufacturers to improve over the capabilities of conventional photolithography has therefore led to the funding of much intensive work in the field of x-ray level photolithography.

Yet the fundamentals of prior art photolithography are self-limiting to enhancements in several ways. Conventional photolithography is a multi-step process. Each step typically contributes an error factor to a finished structure. An example of a photolithography process might include a deposition of a specific material onto a substrate, the application of a layer of photoresist over the substrate, a soft bake of the photoresist, an exposure of the photoresist layer to a pattern-masked light source, the development of the photoresist, a hard bake of the photoresist and finally an etching step.

Each step in this example photolithography process has limitations in accuracy and result. The validity of the deposition action is dependent upon the uniformity of the layer of material actually deposited. The resolution of the component structures of the device defined in the photoresist development steps is limited by the wavelength of light used, the geometric accuracy of the pattern-mask, the effects of unintended under or over exposure to the light source, and the equally unintended effects of under development or over development of the photoresist after exposure to the light source. The soft baking and/or the hard baking of the photoresist can also be over or under done. The precision of the etch step is affected by the degree of selectivity of the etching agent and the degree of anisotropy achieved in the delivery of the wet or dry etching agent across the entire surface of the substrate.

The errors introduced by each step of the photolithography process are further compounded by the fact that the fabrication of most semiconductor devices requires the repeated application of entire cycles of photolithography processes which employ widely varying deposition materials, photoresist compounds, etching chemicals, pressure and temperature requirements. The net result is often an increasing limitation in the smallest achievable individual structure size, as well as reduction in the control of precision in device feature fabrication.

The sheer number of individual process steps of a typical device fabricated with conventional photolithography techniques raises the statistical occurrence of contaminating events during the manufacturing process. The elimination of process steps in itself typically results in yield improvement.

The dominant trend in the art is to attempt to increase the accuracy of each step of the photolithography process. Accuracy in etching may be increased by reducing the thickness of the deposited film. However, this increases the requirements for uniformity in the deposition phase. In addition, these thin deposition layers are, in some cases, thin enough to experience and exhibit quantum phenomenon and behavior. However, for the most part, these layers have bulk material properties. This can lead to many uncontrolled parameters during the fabrication stage. For example, a convex surface profile of the deposited layer may lead to strained and mismatched lattices, thus creating devices susceptible to failure through numerous mechanisms.

The pursuit of better photolithography through the application of higher frequency light waves, such as hard ultraviolet and x-rays, is based upon a relationship expressed in the Rayleigh Criterion between the wavelength of a light wave and its corresponding achievable diffraction limit.

The Rayleigh Criterion is given by:

$$d=0.61\ \lambda\ \text{N.A.}$$

where $\lambda$=operational wavelength of the emitted light;

N.A.=Numerical Aperture of the imaging optic; and d=diameter of the minimal achievable spot size.

Replacing $\lambda$ in the equation of the Rayleigh Criterion with the wavelength $\lambda$ of a particular light wave will yield the diffraction limit of the light wave emitted at that frequency. Higher frequencies obviously exhibit lower diffraction limits.

The employment of shorter illumination wavelengths does theoretically allow for the definition of significantly smaller device feature sizes. Unfortunately, however, the greater photon energies of higher frequency light waves often create other obstacles to the process of manufacturing smaller geometric features. Higher frequency light waves are more likely to damage lithographic mask optics very quickly because of their high levels of material interaction reactivity. Light waves of wavelengths below 200 nm are more prone to uncontrolled scatter and absorption by the substrate and other deposited materials. Higher energy photons are also more prone to damage the material that they are bombarding.

Conventional photolithography techniques, including those employing x-rays, still typically include an etching step and require the provision of a substrate composed of a pure single crystal, such as silicon or gallium arsenide. Device structures are currently fabricated with atoms in higher energy states, which result in an increased incidence of lattice mismatch and attendant structural fragility.

Furthermore, most conventional photolithography applications entail the production of environmentally hazardous solutions, reagents and by-products. Manufacturing techniques that reduce the generation of biohazardous material by the nano-device industry, and especially the semiconductor device industry, are of significant benefit to the both manufacturers and the world community.

Creative and meaningful work has been done in the area of controlling the deposition of atoms through the Lorenz force effect created by the interactions between an atomic dipole and a standing light wave. Much of this work exploits the generation of a Lorenz force caused by the interaction of an atom, behaving like an oscillating dipole, with the oscillating electric field of a laser. The atom behaves like an oscillating dipole acted on by a Lorenz force, where the Lorenz force is proportional to the intensity gradient of the oscillating electric field of the laser.

J. J. McClelland and M. R. Scheinfein, for a first example, proposed the use of a laser beam as a means of focusing an atomic beam to create nanometer, or nm, scale spots. (J. J. McClelland and M. R. Scheinfein, "Laser focusing of atoms: a particle-optics approach", J. Opt. Soc. Am. B/Vol. 8, No. 9/September 1991, pp. 1974–1986, which is hereby incorporated by reference) McClelland and Scheinfein envisioned the employment of a $TEM_{01}$ laser as an atomic lens whereby the direction of an atomic beam is purposely directed with a focal spot size on the order of one nanometer.

T. Sleater et al. have reported on the successful implementation of an atomic lens scheme wherein a cylindrical lens potential was created by positioning a large period, 45 micron, standing light wave perpendicular to a supersonic beam of metastable helium atoms. (T. Sleator, T. Pfau, V. Balykin, and J. Mlynek, "Imaging and Focusing of an Atomic Beam with a Large Period Standing Light Wave", Applied Physics B, 1992, pp. 375–379, which is hereby incorporated by reference) The thinness of the established lens was estimated to be 40 microns. An achieved spot size of four microns was primarily limited by diffraction. Additionally, a microfabricated grating with a period of eight microns was constructed. Chromatic, spherical and diffusive aberrations appeared to have little impact on the spot size. Sleator et al. further suggested that the thinness of the lens could enable lithographic applications in the nanometer range.

Sleator et al., with helium atoms excited by copropagation of electrons at an energy level of about 31 eV, has a resulting beam of metastable helium atoms having an average velocity of approximately 1760 m/s and a corresponding deBroglie wavelength of 0.56 angstroms.

The deBroglie wavelength is calculated from the following expression:

$$l_{db}=h/mv=$$

where h=Planck's constant=$6.62\times10^{-34}$ J/second;

m=the mass of the atom in Kg; and v=the velocity of the atom in meters/second.

Sleator et al. further proposed that their technique could be generalized to two dimensions by combining two standing waves. The creation of two dimensional device structures should thereby be executable. Sleator et al. also predicted that an atomic beam exhibiting a particle velocity of 900 m/s should be focusable with a laser power of ten mW into spot sizes of ten nm.

In another example where neutral atom lithography was accomplished, Timp et al. used an optical standing wave of 589 nm as an array of cylindrical lenses to focus a perpendicular sodium beam and to thereby construct a grating on a substrate, where a periodicity of 294.3+/−0.3 nm was achieved. (G. Timp, R. E. Behringer, D. M. Tennant, and J. E. Cunningham, "Using Light as a Lens for Submicron, Neutral-Atom Lithography", Physical Review Letters, Vol. 69, No. 11, Sep. 14, 1992, pp 1636–1639, which is hereby incorporated by reference.)

G. Timp et al. further described a collimated sodium atomic beam propagating along a y axis and interacting with a perpendicularly oriented standing wave (SW). In preparing the atomic beam for interaction with the standing wave the atomic beam was passed through a "Doppler" optical molasses in order to reduce the transverse velocity and cool the sodium atoms. The average force, $U_{(z)}$, exerted by the standing wave on the sodium atoms then acts as an array of weak cylindrical lenses and focuses the atomic beam into a grating on the substrate with a period one half of the wavelength of the standing wave, or approximately 589 nm/2=294.5 nm.

J. J. McClelland et al. report the use of laser light to control the motion of a chromium atomic beam to fabricate a nanostructure. (J. J. McClelland, R. E. Scholten, E. C. Palm, and R. J. Celotta "Laser-Focused Atomic Deposition" Science, Vol. 262, Nov. 5, 1993, pp. 877–880, which is hereby incorporated by reference.) The resulting nanostructure consisted of a series of lines which showed line widths of 65 nm+/−6 nm, line spacings of 212.78 nm and heights of 34 nm+/−10 nm.

The techniques of Timp et al., Sleator et al. and McClelland et al., rely upon the application of the two interaction mechanisms existing between laser fields and atoms, namely the spontaneous force and the dipole or gradient force. The dipole force is discussed above as the Lorenz force. The spontaneous force is used in the construction of an optical molasses, where a laser field repeatedly bombards an atom with photons. The atom will then radiate photons in random directions through spontaneous emission. The resultant effect of this atomic absorption and radiation of photons includes a net transfer of momentum to most of the subject atoms in the direction of the absorbed photons, as the momenta of spontaneously emitted photons will statistically average to zero. Thus, the spontaneous force can be used in an optical molasses apparatus to cool an atomic beam.

The conventional art thus shows an interest in using lasers to direct the deposition of atomic beams onto substrates and to form simple structures and features of nano-devices and semiconductor devices. The prior art, however, lacks significant enablement work to allow for the efficient construction of most conventional semiconductor devices, as the creation of large numbers of nanostructures by the direct deposition of atomic beams onto substrates via the application of Lorenz force interactions between atomic beams and light fields requires the production of numerous specific patterns of photonic energy.

The technologies of holographic generation, however, offer efficiencies in the creation of the necessary photonic energy patterns. Commercially available software packages, e.g. the ZEMAX-EE product from Focus Software or Wolfram Research's Mathematica package, are capable of calculating from a desired holographic shape and orientation to define the required diffraction pattern to generate the intended hologram. These mathematically powerful software programs indicate the feasibility of back calculating diffraction patterns upon the basis of a mathematical definition of the desired image.

The design of photonic lenses to focus a beam of atoms using Lorenz force interactions requires that the shape, energy states of individual atoms and isotopic composition of the atomic beam be precisely anticipated. High intensity evanescent waves have been demonstrated by R. Kaiser et al., (R. Kaiser, Y. Lévy, N. Vansteenkiste, A. Aspect, W. Seifert, D. Leipold and J. Mlynek "Resonant Enhancement of Evanescent Waves with a Thin Dielectric Waveguide", Optics Communications, Vol. 104, No. 4, 5, 6, (1994), pp. 234–240, which is hereby incorporated by reference.) in conjunction with thin dielectric plates to be used as an atomic mirror. The technique of Kaiser et al. couples a laser beam to a dielectric wave guide by optical tunneling through a solid gap. An enhanced evanescent wave is thereby produced in a vacuum above the wave guide. This evanescent wave functions as an atomic mirror.

There is a long felt need in the industries of nano-device and semiconductor device manufacturing to efficiently and accurately define more robust structural components of devices with smaller dimensions than the prior art allows. There is also a long felt need to limit the environmental impact of manufacturing semiconductors by reducing the volume of toxic chemicals generated for and by semiconductor processing. Alternatives to subtractive processing techniques, whereby material is first applied to a substrate or structure and then selectively removed, may therefore offer significant value to the art of nano-device and semiconductor device manufacture.

SUMMARY AND OBJECTS OF THE INVENTION

It is, therefore, an object of the present invention to construct a method and an apparatus for the direct deposition of particles, atoms or molecules with high accuracy on a substrate.

It is another object of the present invention to provide a method and apparatus for direct write fabrication, or direct write lithography, of nanostructures of a nano-device or a semiconductor device through the skillful manipulation of Lorenz force interactions of dipole moments of atoms and light fields.

It is a further object of the present invention to provide a method and an apparatus capable of fabricating nanostructures on amorphous substrates.

It is yet another object of the present invention to provide a method and an apparatus for the planarization of amorphous substrates.

It is still a further object of the present invention to provide a method and apparatus for the achievement of deposition/device layer thickness uniformity and control with improved precision.

It is still another object of the present invention to improve and simplify the manufacturing processes of nano-devices and semiconductor devices. This elimination of process steps typically provides for greater device yields by reducing yield losses due to statistical contamination events.

It is yet a further object of the present invention to provide a method and apparatus capable of producing semiconductor devices with increased robustness and reduced incidence of failure from common causes such as electrostatic discharge events and thermal runaway.

In accordance with the above objects of the invention, the present invention provides a direct write fabrication, or direct write lithography method and apparatus employing the Lorenz force, wherein the interaction of light fields of a photonic lens or lenses with the dipole moment of atoms is used to control the direct deposition of atoms upon appropriate substrates. The method of the present invention precisely controls the amplitude, phase, polarization and dimensions of light fields through the use of holographic techniques and computer generated holographic elements optionally in conjunction with other optical elements to directly manipulate the energy state of individual atoms, thus determining their exact bond sites and energies. In particular, the capability of the preferred embodiment to construct nanostructures with particles, such as atoms or molecules, in lower energy states enables the creation of stronger and more rugged device features. The preferred embodiment of the present invention comprises the additive fabrication process of deposition without requiring the inclusion of subtractive process steps such as etching.

Furthermore, the preferred embodiment of the method of the present invention eliminates or reduces the purity requirement in many applications for expensive single crystal substrates by enabling the depositional construction of nanostructures on amorphous substrate materials. The method of the present invention thus allows the fabrication of device structures on inexpensive amorphous silicon dioxide, e.g. glass, ceramic substrates, or other suitable materials known in the art. Because the preferred embodiment is purely additive, the method of the present invention can reduce the routine preparation and generation of significant volumes of many of the toxic and corrosive chemicals and by-products currently found in conventional art photolithography and etching process steps.

The preferred embodiment of the present invention can be used for substrate planarization and/or the fabrication of semiconductor devices, electro-optical devices, electrical devices, mechanical devices and other devices with nanostructures, or nano-scale features known in the art, thus avoiding the need for multiple lithography, deposition and etch processes and permitting the creation of semiconductor and other nano-fabricated devices with smaller critical dimensions than has heretofore been achieved. The method of the preferred embodiment includes the propulsion of a stream or a vector comprising a substantially isotopically homogeneous matter, such as a highly pure, isotopically specific atomic beam. The stream, vector or particle beam may form a particle, molecular or atomic beam comprising a multiplicity of particles such as single atoms or molecules. The content of the particle beam is filtered from an originating feedstock to comprise a particular and predesignated atomic or molecular isotope. The particle, atomic or molecular beam is generated and processed through ionizing and deionizing steps, detuning stages, an optical molasses region and an output to impose a highly collimated, low energy level uniformity among the individual atoms of the beam. The particle beam is then delivered with predetermined vectors and energy states into a fabrication reactor. The particle beam then interacts with one or more holographically generated laser fields or photonic lenses resident within the fabrication reactor. These photonic lenses are specifically generated to precisely focus the particle beam onto a substrate and thereby create device features and nanostructures by direct write fabrication.

The method of the preferred embodiment requires a process step of a preparation for generation of one or more photonic lenses. This preparatory work includes the steps of: (1.) mathematically modeling a feature or structure to be built, (2.) identifying a particular elemental or molecular isotope that will be used to construct the feature or structure, (3.) determining the vector, energy states and entrance point of the isotope molecules or atoms at the moment of insertion of the particle beam into the fabrication reactor in relationship to the intended position of the substrate during the direct write fabrication action, (4.) back calculating the required characteristics of one or more photonic lenses that will direct, by means of Lorenz force interaction, the particle beam of known parameters to form the mathematically modeled feature or structure, (5.) back calculating the laser frequency or frequencies and the diffraction pattern or patterns required in one or more optical lenses to generate the required photonic lens or lenses as defined in step 4 and (6) prepositioning a laser source or sources which can generate the required laser frequencies, as determined in step 5, in relationship to i.) a substrate, ii.) the optical lens or lenses, where the lens or lenses contain the necessary diffraction patterns as calculated in step and iii.) the fabrication reactor, whereby the required photonic lens or lenses are established within the fabrication reactor coincident with and in proper orientation to the introduction position of the particle beam containing the preselected isotope and the substrate in order to build the predesignated feature or structure.

The method of the present invention includes the inventive application of concepts and techniques used to shape light beams in the optical arts to condition and shape a particle beam and to establish the energy characteristics, instantaneous quantum nature and flow vector of the particle beam to create nano-device and semiconductor device features and structures on a prepositioned substrate.

The method of the present invention as carried out in the preferred embodiment requires the provision of a feedstock into a high temperature vacuum crucible from which a feedstock vapor is generated. A particular isotope of the feedstock vapor is then isolated by a photo-ionization step wherein a laser tuned to a specific frequency chosen to selectively ionize the desired isotopic species, and with minimal affects to the remainder of the feedstock vapor, is focused at the feedstock vapor. The newly formed ions of the isotopic species are then directed into and through a particle beam generator by means of the momentum imparted to the selected isotopic atomic species from the photo-ionization action, and by means of conventional art ionic pumps and electromagnetic field buffering. The beam of ions is then de-excited by application of detuned radio frequency energy and neutralized by interaction with an electron source. The electrically neutral particle beam next leaves the particle beam generator after passing through, and being more precisely shaped by, a grazing incidence nozzle. The particle beam is immediately inserted from an exit port of the grazing incidence nozzle into an optical molasses cooling chamber. The optical molasses cooling chamber reduces the energy level of the isotopic species to near ground level yet allows the particle beam to continue onward and through an output coupler. The output coupler of the preferred embodiment includes a set of tuned traveling/evanescent wave plates. Certain alternate preferred embodiments of the present invention optionally include magnetic mirrors in combination with electromagnetic probing energy and/or other suitable components and methods in the design of various alternate output coupler embodiments.

The output coupler further uniformly orders the individual isotopic species atoms into a narrow band of low energy states and delivers the particle beam to a fabrication reactor. The particle beam then comprises a multiplicity of atoms of the preselected isotopic species wherein virtually all of the isotopic atoms exhibit an energy level within an anticipated and narrow band of energy states. A photonic lens is synchronously generated in the fabrication reactor to direct the particle beam towards a location on a prepositioned substrate in order to form a desired structure. The control of the flow vector of the particle beam is accomplished by means of Lorenz force interactions of the photonic lens or lenses with the dipole moments of the individual atoms of the particle beam. The term flow vector is defined as the three dimensional direction and speed of the atoms of the particle beam in either an individual or a collective sense. Each photonic lens is imposed within the reactor by means of passing a laser beam of a preselected frequency and energy content through an optical lens, where the optical lens contains a particular and previously calculated and recorded holographic diffraction pattern.

The method of the present invention teaches that a photonic lens is generated from a material holographic lens, e.g. glass, where the photonic lens directs the flow of a relatively isotopically pure atomic or molecular particle beam towards a substrate to effect the fabrication of a nano-scale device feature of a predetermined size, shape and orientation within the substrate. The form and strength of the desired photonic lens is calculated from a precise knowledge of the physical, quantum and electromagnetic properties of the particular isotopic species to be controlled, the position of the substrate in relation to the pathway of the particle beam and a mathematical description of the size, shape and orientation of the desired nano-feature within the substrate. The diffraction pattern of the material holographic lens used to generate the photonic lens is back calculated from a knowledge of the nature of the laser beam frequency and strength available, the nature of the holographic lens material, the physical position of the holographic lens in relationship to the particle beam and the substrate, and the shape, size, orientation and strength of the photonic lens. These, together with the various ancillary objects and features, will become apparent to those possessing the ordinary skill in the art as the following description proceeds, a preferred embodiment being shown with reference to the accompanying drawings, by way of example only, wherein:

BRIEF DESCRIPTION OF THE DRAWINGS

FIG. 5A, FIG. 5B and 5D are close-up cross-sectional views of a deposition of carbon atoms on a portion of a ceramic wafer to create a thin and uniform diamond crystal layer. FIG. 5C is a close-up top view of the deposition.

DETAILED DESCRIPTION OF THE PREFERRED EMBODIMENT

The following description is provided to enable any person skilled in the art to make and use the invention and sets forth the best modes contemplated by the inventor in implementing the method of the present invention. Numerous variations and modifications of the preferred embodiment are, however, readily apparent to one skilled in the art and in light of this disclosure, as the generic principles of the present invention are defined herein.

Figure 1:
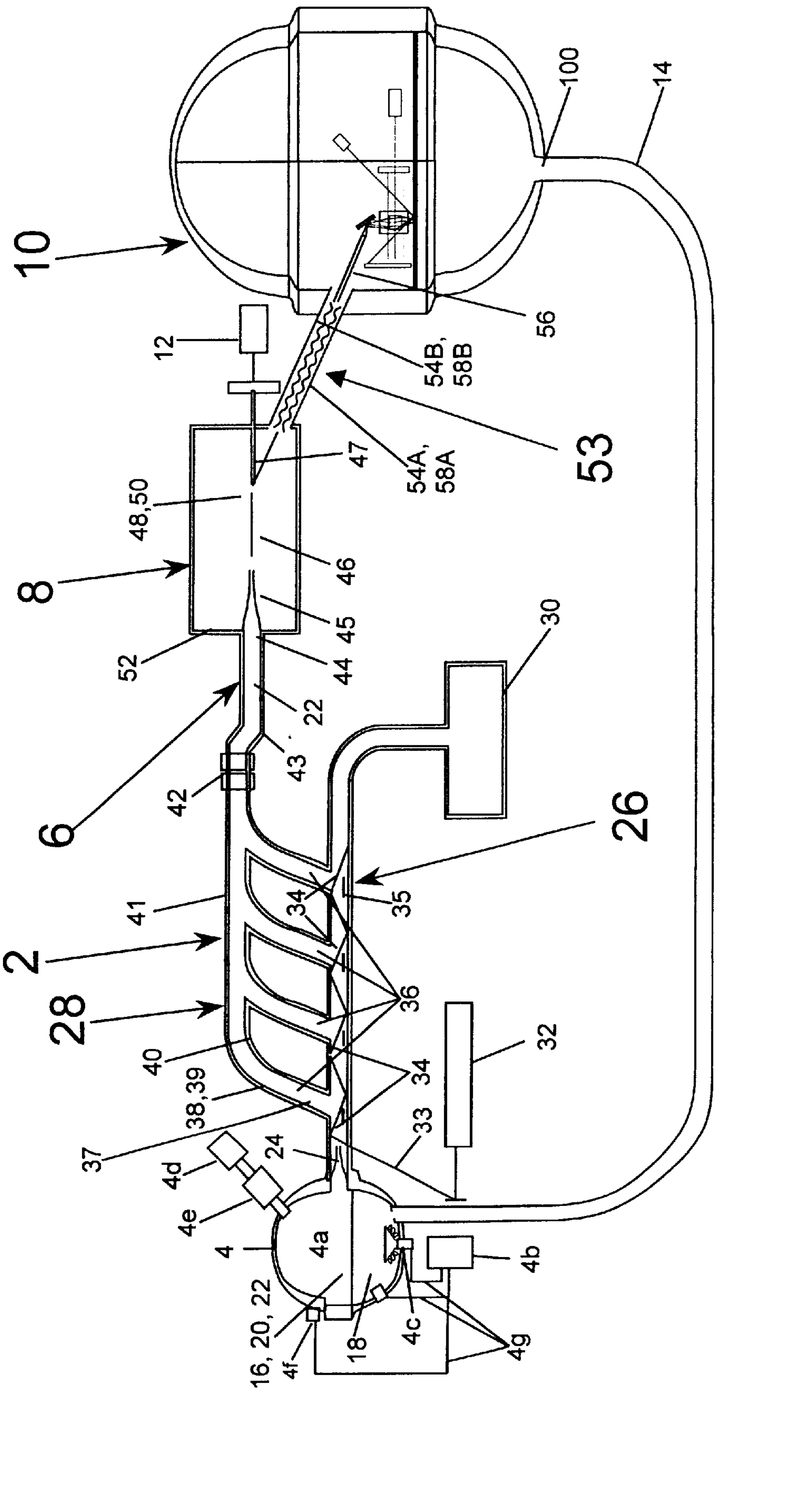
FIG. 1 is a systems level view of a preferred embodiment of the present invention and including a fabrication reactor.

Referring now to FIG. 1, a preferred embodiment of the present invention 2 is shown to include a high temperature vacuum feedstock crucible 4, an atomic beam generator 6, an optical molasses region 8, a fabrication reactor 10, a tunable single-line/single-mode laser source 12 and a waste recycling conduit 14. The function of the feedstock crucible 4 is to generate a feed of atoms 16 from a feedstock 18. A chromium feedstock 18 is considered herein where the chromium feedstock 18 includes a relatively pure collection of isotopically varying chromium atoms 20. The preferred embodiment 2 is capable of processing feedstock 18 composed from a variety of alternate and preselected elements and compounds. In a preferred embodiment of the present invention 2, the chromium feedstock 18 comprises an assortment of multiplicities of isotopes of chromium atoms 20, where the assortment includes a multiplicity of atoms of a specific chromium isotope atom 22. The chromium feedstock 18 is placed inside of the feedstock crucible 4 in order to generate the feed of atoms 16 at high temperature and at near vacuum.

The crucible 4 and the atomic beam generator 6 are primarily designed to select out a multiplicity of atoms of the specific chromium isotope 22 from the feed of atoms 16 and transport a highly pure and homogenous stream of atoms 22 of the specific chromium isotope 22 into the optical molasses region 8 in a relatively coherent state.

The feedstock crucible 4 generates the feed of atoms 16 by imposing a vacuum at a preselected internal temperature onto the feedstock 18. The feedstock crucible 4 comprises an interior 4*a*, a controller 4*b*, a heating element 4*c*, a roughing pump 4*d*, a turbo-pump 4*e*, an internal temperature and pressure sensor 4*f* and a communications signal line 4*g*. The interior 4*a* contains the feedstock 18 and initially contains the feed of atoms 16. The controller 4*b* is programmed to heat the feedstock 18 by means of heating element 4*c* and drive the atmospheric pressure within the crucible 4 towards a low pressure state by means of the roughing pump 4*d* and the turbo-pump 4*e*. The controller 4*b* monitors the internal temperature and pressure sensor 4*f* and signals a crucible exit port 24 to open via the communications signal line 4*g* when the internal temperature and atmospheric pressure of the interior 4*a* has achieved a preselected point or entered into a preselected range.

The evaporation of the chromium atoms 20 is accomplished by standard low pressure heating techniques in the preferred embodiment 2, but is accomplished by laser applications or with the use of an electron beam, or by other suitable means known in the art, in certain alternate embodiments of the present invention. When the feedstock 18 has come to a desired temperature and the feed of atoms 16 has attained a desired vapor pressure within the crucible 4, and crucible exit port 24 is directed to open, the feed of atoms 16 flows into the atomic beam generator 6. The crucible exit port 24 is shaped to provide a primary level of atomic beam shaping to the feed of atoms 16 which facilitates the atomic beam generation process.

The crucible exit port 24 is, in turn, directed toward and attached to the photo-ionization manifold 26 of the atomic beam generator 6. In addition to the photo-ionization manifold 26, the atomic beam generator 6 is composed of an isotope ion pump and optics manifold 28 and a recycling collector 30.

The feed of atoms 16 is roughly shaped while exiting the crucible exit port 24 to travel along the photo-ionization manifold 26. This pathway takes the chromium atoms through a pathway of a laser beam 33, where the laser beam 33 is emitted by a set of tunable lasers 32 of the photo-ionization manifold 26. The feed of atoms 16 is then bombarded with the laser beam 33 output of the tunable lasers 32. The laser beam 33 strikes and ionizes many of the isotopic atoms 22 at various photo-ionization locations located within the photo-ionization manifold 26.

The instantaneous frequency of the tunable lasers 32 is selectably preset to ionize the specific chromium isotope atoms 22 by electron removal. In this example case, the tunable lasers 32 are set to generate the laser beam 33 exhibiting a frequency of light corresponding to a wavelength of 425.55 nm to ionize the chromium isotope atoms 22. It is well understood in the art that most isotopic species may be ionized by laser beams 33 at more than one particular frequency.

Certain alternate preferred embodiments of the present invention process two or more isotopic species, and construct nano-features with these isotope atoms, by the application of a plurality of tuned and detuned laser and radio frequency energies.

Certain alternate preferred embodiments of the present invention effect selective isotope extraction by electron addition to individual atoms or with other suitable means known in the art.

The specific chromium isotope atoms 22 are separated from the feed of atoms 16 at several lasing locations 34 within the photo-ionization manifold 26 by the resonantly tuned, focused laser beams 33, whereby a significant percentage of a multiplicity of the specific chromium isotope atoms 22 are selected out and ionized. This repetition of exposure of the feed of atoms 16 to the ionizing effect of the tunable lasers 32 at the photo-ionization locations 34 results in the extraction of a larger quantity of atoms 22 per unit of time of the specific chromium isotope atom 22, whereby a higher rate of nanostructure fabrication is ultimately enabled within the preferred embodiment 2.

As various materials are used in device fabrication, several ionization conditioning tunable lasers 32 are available for multi-level excitation state pumping in certain alternate preferred embodiments of the present invention.

The isotope atoms 22 which are ionized by interaction with the lasers 32 are transformed into positively charged ions 37. Ions 37 are then directed through appropriate channels 36 of the isotope ion pump and optics manifold 28 towards the optical molasses region 8. The feed of atoms 16, less the removed ions 37, flows out of the photo-ionization manifold 26 and into the recycling collector 30. The feed of atoms 16 thus deposited in the recycling collector 30 may be discarded or reprocessed for insertion as a component of the feedstock 18. A set of electrically charged repulsive plates 35 is located within the photo-ionization manifold 26 and distal from the channels 36. The function of the repulsive plates 35 is to drive the newly formed ions 37 out of the feed of atoms 16 and into the channels 36 of the ion pump and optics manifold 28. A positive electric charge is therefore provided for the repulsive plates 35 in the preferred embodiment 2 discussed herein.

Each channel 36 of the isotope ion pump and optics manifold 28 transfers the ions 37 by means of a conventional art ion pump 38. The ion pumps 38 impose varying electrical charges to draw the ions 37 away from the photo-ionization manifold 26 and towards the optical molasses region 8.

Electromagnetic fields 39 are generated by electromagnetic coils 40 to repel the ions from the walls 41 of the isotope ion pump and optics manifold 28 and thereby reduce or effectively eliminate the collision of the ions 37 with the isotope ion pump and optics manifold 28 itself. The electromagnetic fields 39 thereby reduce loss of the ions 37 en route to the fabrication reactor 10 and limit contamination of the walls 41.

A set of radio frequency, or RF, damping field coils 42 are positioned within the isotope ion pump and optics manifold 28 and are tuned to create dampening electromagnetic fields which effect a controlled de-excitation of the ions 37.

The atomic neutralization electron source 43, which acts on the ions 37 after the RF damping field coils 42, neutralizes the charge on the ions 37 by means of adding electrons. The ions 37 of the specific chromium isotope atoms 22 experience the replacement of stripped electrons, and are thus transformed into neutrally charged isotope atoms 22, as the ions 37 pass near the atomic neutralization electron source 43.

The now electrically neutral isotope atoms 22 still have a significant thermal velocity which is reduced and controlled in the optical molasses region 8. The atomic beam 44, composed of atoms 22, passes out of the optics manifold 28 through a grazing incidence nozzle 45 and into the optical molasses region 8. The grazing incidence nozzle 45 is shaped to act upon the atoms 22 of the atomic beam 44 in a manner roughly analogous to the manner with which grazing incidence optics collimate the beams output from an x-ray or a deep ultraviolet energy source. The theory of design and method of operation of the grazing incidence nozzle 45 is more thoroughly discussed below in a discussion of FIG. 7.

After exiting the nozzle 45, the atomic beam 44 next encounters a precisely defined optical molasses field 46 created by means of the multi-axis resonantly detuned laser beams 47. The laser beams 47 are resonantly detuned in relationship to a preselected transition energy level of the anticipated chromium isotope atoms 22 in this example case presented herein. Detuning is a process whereby a frequency is offset from a reference frequency by some magnitude of frequency band. The laser beams 47 of the optical molasses region 8 are detuned from a specific frequency corresponding to a known transition energy level of a particular species of isotope, e.g. atoms 22. In other words, the instantaneous frequency of the laser beams 47 in application with the chromium isotope atom 22 is set at a frequency of light offset from a frequency that is known to match the energy level of a particular transition energy level of this isotopic atom 22. An offset frequency band on the order of +/−100 MHz is typically acceptable as a detuning offset. A detuned laser is thus generated at a frequency of light slightly offset, or detuned, from the resonant frequency of the isotopic species, e.g. the atoms 22, input to the optical molasses region 8. In the case of the chromium isotope atoms 22 of this example, a frequency of light with a wavelength of 425.55 nm is used as a reference for a frequency from which a detuned laser beam frequency is offset by +/−100 MHz.

The laser beams 47 strike the isotope atoms 22 passing through the optical molasses region 8. These beams 47 are generated from the tunable laser source 12 at a specific and preselected frequency detuned from the reference frequency of an energy transition level of the isotope atom 22. The optical molasses field 46 cools the atoms 22 to an excitation state near the ground level and prepares the atoms 22 for further conditioning. An electromagnetic field 48 is generated within the optical molasses region 8 by electromagnets 50 and is shaped to limit collisions of the atoms 22 with walls 52 of the optical molasses region 8. The magnetic field 48 is also intentionally shaped and defined to encourage the atoms 22 to move forward through the optical molasses region 8 and towards the fabrication reactor 10. This spatial bias quality of "forward leakiness" of the magnetic field 48 is helpful to the progress of the atoms 22 through the invented system 2.

Most of the cooling effect of the preferred embodiment of the present invention 2 begins shortly after the exit of the atoms 22 from the atomic neutralization electron source 43 which feeds the neutralized, yet energetic, atoms 22 into the optical molasses region 8. The function of the optical molasses field 46 is to reduce the temperature, kinetic energy and velocity of the neutral, specific isotope chromium atoms 22. After being substantially reduced in temperature and velocity by the optical molasses field 46, the atoms 22 next pass through an output coupler 53. The output coupler 53 performs a function, in the preferred embodiment 2, on the atomic beam 44 analogous to the effect of an optical output coupler to a laser beam in a laser system.

The output coupler 53 more highly orders the atoms 22 in relation to each other by means of applying a modulated traveling phased wavefront 58A, 58B comprising at least one electromagnetic wave 58A, 58B. The wavefront 58A and 58B may be applied via a set of evanescent wave plates 54A, 54B or other suitable means known in the art.

Please note that the positive and negative sign convention for detuned electromagnetic radiation used within this disclosure sets positive detuning as blue detuning and negative detuning as red detuning. Blue positive detuned electromagnetic radiation is repulsive to the atoms 22, and red negative detuned electromagnetic radiation is attractive to the atoms 22.

The output coupler 53 of the preferred embodiment includes a pair of tuned traveling/evanescent wave plates 54A, 54B. The tuned traveling/evanescent wave plates 54A, 54B transform the atomic beam 44 into a more coherent and uniform atomic deposition beam 56. The atoms 22 contained in the resultant atomic deposition beam 56 exhibit a precisely defined and narrow band of forward velocities, divergence, magnetic moment, polarization and spin. The evanescent wave plates 54A, 54B are shaped and tuned for a final conditioning of atomic deposition beam 56 before insertion of the atomic deposition beam 56 into the fabrication reactor 10.

Figure 2:
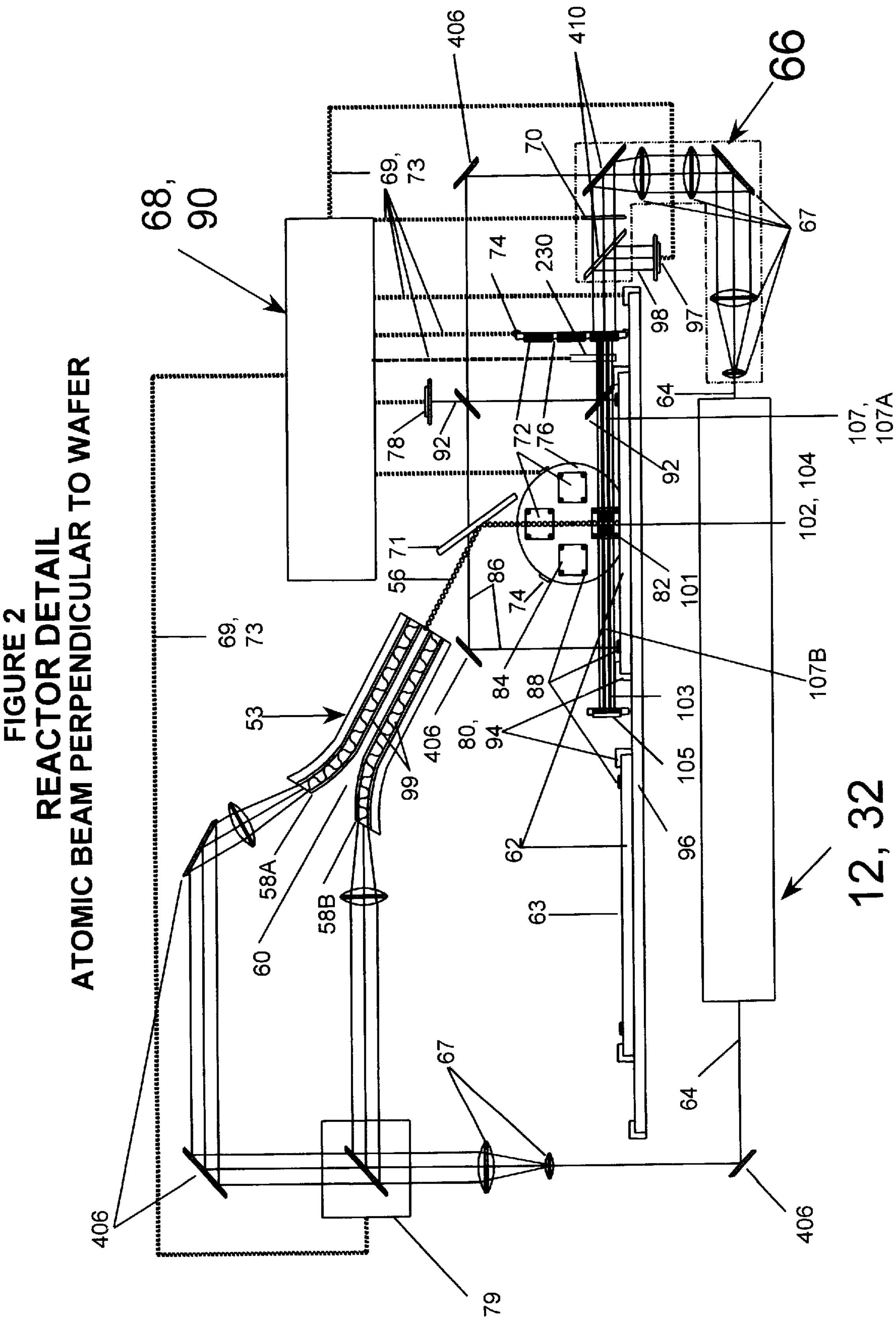
FIG. 2 illustrates the fabrication reactor of the preferred embodiment of FIG. 1 wherein the atomic beam of FIG. 1 is focused substantially perpendicular towards a silicon wafer.

Referring now generally to the Figures, and particularly to FIG. 1 and FIG. 2, the transformation of the atomic beam 44 into the atomic deposition beam 56 is achieved by directing the atoms 22 exiting from the optical molasses region 8 through the specially shaped and designed evanescent wave plates 54A, 54B. The evanescent wave plates 54A, 54B have detuned, traveling evanescent waves 58A, 58B launched longitudinally along the plates 54A, 54B which give rise to repulsive electromagnetic field interactions as the atoms 22 approach the plates 54A, 54B. The evanescent wave plates 54A, 54B are arranged such that the geometry of the plates 54A, 54B at the entrance 60 of the output coupler 53 serves to concentrate the atomic beam 44 as much as possible while maintaining the atoms 22 in a ballistic state. The traveling evanescent waves 58A, 58B are modulated and are traveling towards the fabrication reactor 10. The net result of this conditioning action of the plates 54A, 54B is to capture the individual atoms 22 of the atomic beam 44 and increase the coherence of the atomic deposition beam 56 prior to insertion of the atoms 22 by the output coupler 53 into the reactor 10 for use in the direct write fabrication which follows immediately hereafter. The theory of operation of the output coupler 53 is reviewed below in the discussion of FIG. 6.

Finally the atoms 22 intended for deposition on the silicon wafer 62, as shown in FIG. 2, are directed into the fabrication reactor 10. Additionally, FIG. 1 shows in schematic form the tunable single-line/single-mode laser sources 12, 32. As shown in FIG. 2, the two laser sources 12, 32 are combined into a single unit which generates both beams 64. The laser beam 64 of the laser source 12 is directed towards the fabrication reactor 10 by means of the laser beam conditioning and delivery optics 66.

Several components of the fabrication reactor 10 of FIG. 1 are shown to be configured to direct the atomic deposition beam 56 towards, and in a pathway roughly perpendicular to, the surface 63 of the silicon wafer 62.

The tunable laser source 12 produces a laser beam 64 of a preselected frequency detuned from a transition energy level reference frequency of the atoms 22. The laser beam 64 is then introduced into and conditioned by the output laser beam conditioning and delivery optics system 66. The conditioning and optics system 66 includes a system controller 68, optical elements 67, electro-optic modulator 79, communication lines 69, a corrective optic 70, a mechanical holographic element 71, a plurality of holographic optical elements 72, a communication network 73, a plurality of optical element positioners 74, a plurality of optical element carousels 76, an optical sensor 78 and a substrate wafer positioning system 80. The optical element positioners 74 are located on and grossly positioned by the optical element carousel 76. The system controller 68 directs the optical element carousel 76 to present a particular holographic optical element 72, or HOE 72, for illumination by the laser beam 64. The appropriate optical element positioner 74 is further directed by the system controller 68 to finely manipulate the position of the selected HOE 72 to optimize the quality and precision of the illumination of a resultant photonic lens 82. The optical element positioner 74 may include or be actuated by a piezoelectric mechanism, electromagnetic mechanism or any other suitable mechanism known in the art that can controllably and reproducibly execute precise positioning of the HOE's 72.

The optical elements 67 are laser beam conditioning optic lenses. These optical elements 67 prepare the laser beam 64 for launching into the electro-optic modulator 79. The electro-optic modulator 79 simultaneously separates the laser beam 64 into phase and anti-phase conditioned wavefronts while simultaneously imposing radio frequency information onto the phased components of the beam 64 containing the traveling wave component information.

The system controller 68 receives and transmits status signals and control signals throughout the conditioning and optics system 66 via communication lines 69 and the communication network 73.

The mechanical holographic element 71 is a material object that deflects and shapes the pathway of the atomic beam 56 towards the surface 63 of the silicon wafer 62.

The laser beam 64 exits the laser source 12 and then passes through the corrective optic 70. The laser beam 64 next passes through a particularly prepared and selected holographic optical element 72. The laser beam 64 then creates and projects a photonic lens 82 by illuminating a prerecorded diffraction pattern 84 of the selected HOE 72.

The diffraction pattern 84 is computer generated on the basis of back calculations from a mathematical description of a structure or feature desired to be built, the expected physical and quantum level characteristics and properties of the atoms 22 at the moment of entry into the fabrication reactor 10, the intended shape and position of the silicon wafer 62 when positioned for processing within the reactor 10 and the frequency and orientation of the laser beam 64. This information is used to calculate the shape of the photonic lens 82 or lenses and the orientation of the lens 82 or lenses to the silicon wafer 62, that must be generated to direct the atoms 22 of the coherent atomic deposition beam 56 toward the silicon wafer 62 to construct a specifically intended feature or structure.

The optical sensor 78 dynamically monitors the relative degree of the desired alignment of the wafer 62 with the photonic lens 82 and informs the system controller 68 thereof. A first sample 86 of the output laser beam 64 is reflected by a holographic alignment reticule/fiducial 88. The fiducial 88 is located on the periphery of the surface of the wafer 62 and transmits the first sample 86 to a holographic reticule/fiduciary electro-optical alignment comparator 90. A small and complementary second sample 92 of the output laser beam 64 is additionally observed by the electro-optical alignment comparator 90 immediately after the second sample 92 has passed through the illuminated HOE 72. The electro-optical alignment comparator 90 analyzes the first and second samples 86, 92 by comparison and then provides positional quality feedback to the system controller 68. The system controller 68 processes this data and adjusts the optical element positioners 74, the optical element carousel 76 and the substrate wafer positioning system 80 to establish the optimal positioning of the illuminated HOE 72 and the wafer 62 to most effectively execute the intended atomic deposition.

The substrate wafer positioning system 80 includes a plurality of substrate positioners 94 and a substrate carousel 96. Each substrate positioner 94 is supported by, attached to and coarsely aligned by the substrate carousel 96. The substrate positioners 94 may include a piezoelectric system, electromagnetic system or any other suitable sub-systems known in the art for positioning the silicon wafer 62 in a precisely controllable and reproducible fashion.

A laser sensor 97 receives and detects a weak sample 98 of the laser beam 64 that is reflected off of the illuminated HOE 72. The system controller 68 compares the output signal of the laser sensor 97 against an expected output signal of the weak sample 98 of an ideal laser beam and adjusts the corrective optic 70 to more appropriately correct and shape the laser beam 64 to present an ideal illumination source to the illuminated HOE 72. The improvement of quality of the laser beam 64 delivered to the illuminated HOE 72 is achieved through the application of phase conjugate optics or other suitable means known in the art.

Figure 3A:
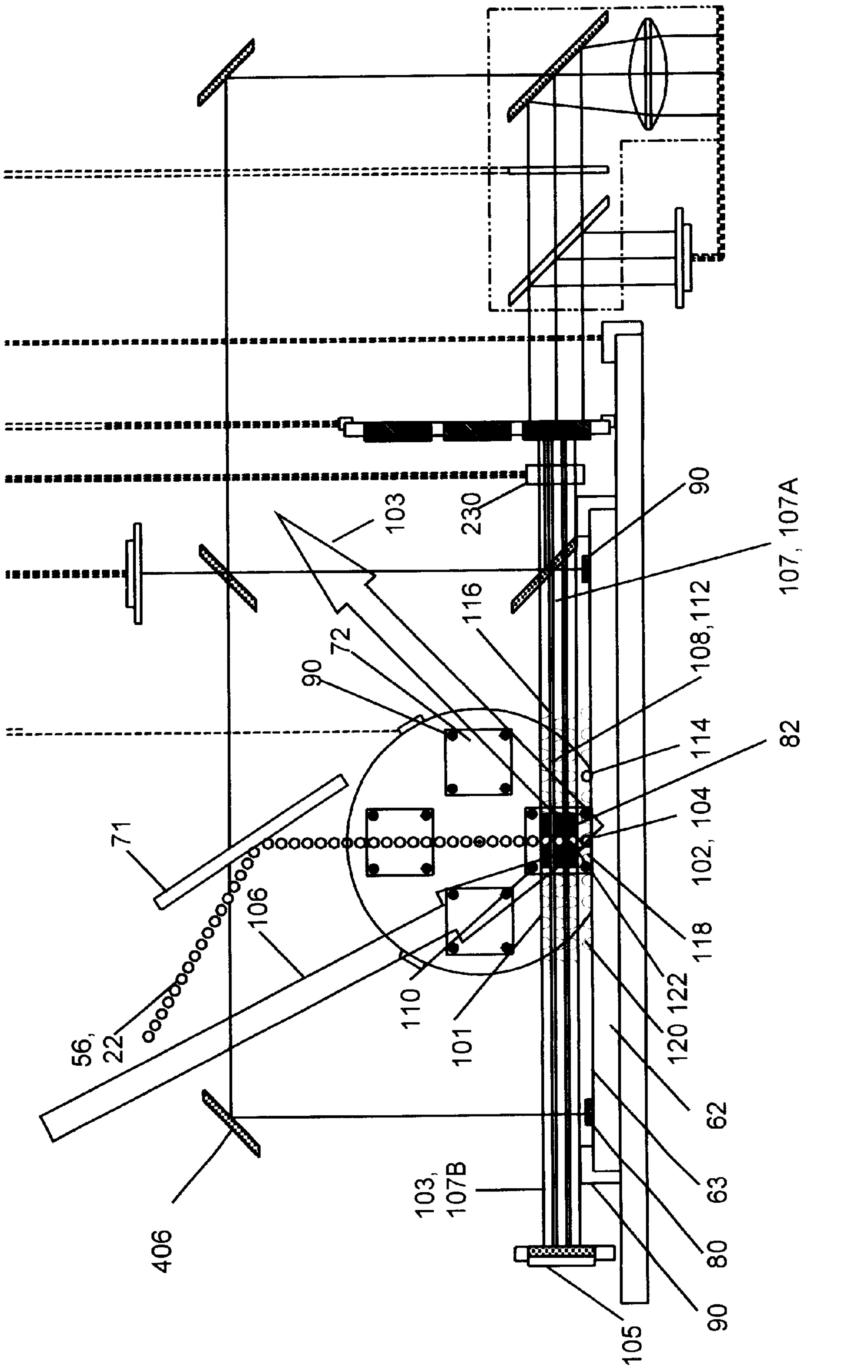
FIG. 3A is a close-up cross-sectional view of a portion of the silicon wafer of FIG. 2 during atomic deposition and feature construction.
Figure 3B:
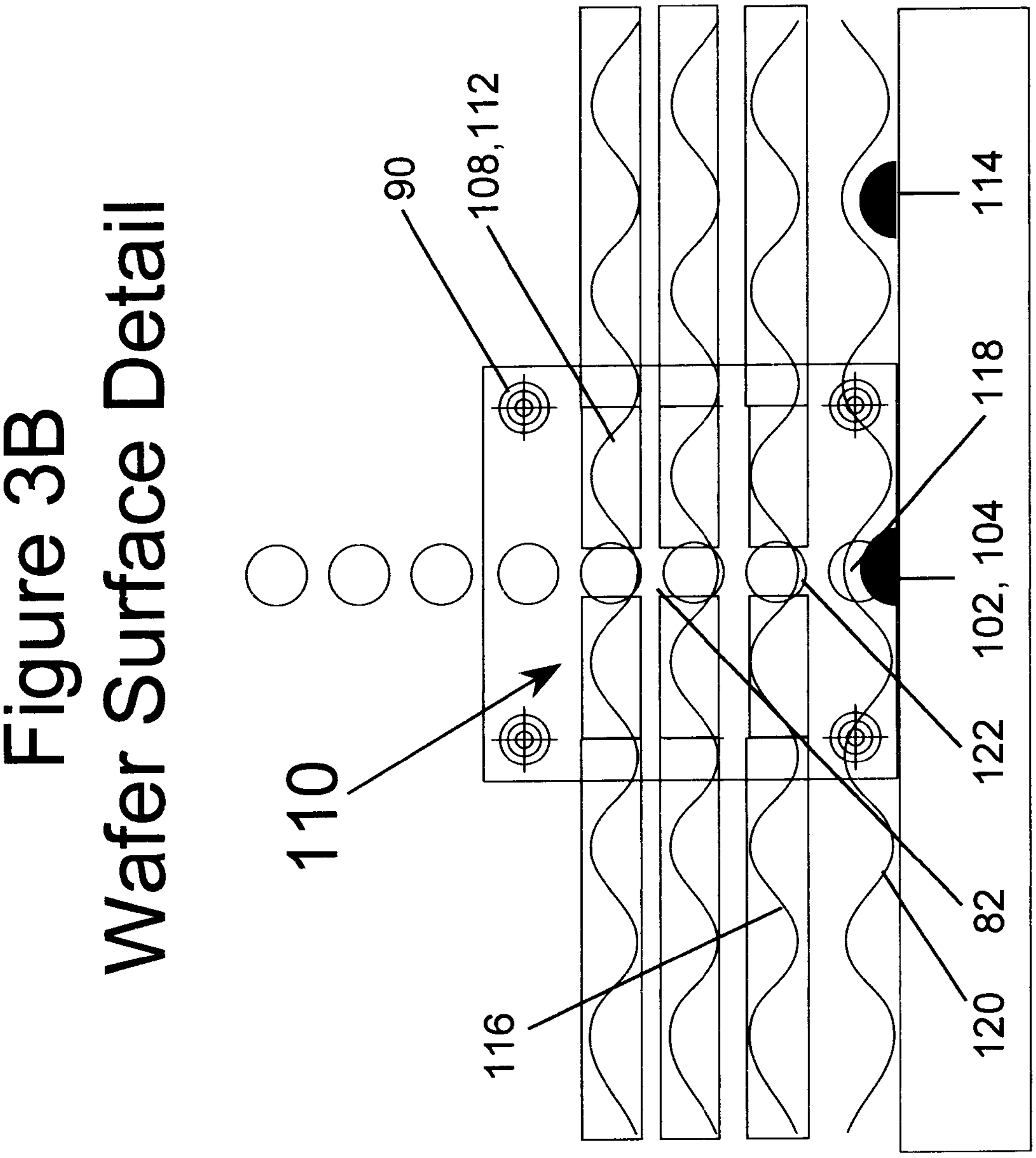
FIG. 3B is a further amplified view of FIG. 3A.

Referring now to FIG. 3A and FIG. 3B, atoms 22 of the atomic deposition beam 56 that are not deposited onto the wafer 62 exit the fabrication reactor 10 via a pair of focusing evanescent wave plates 99. The focusing evanescent wave plates 99 serve as an entrance aperture to the waste recycling conduit 14. Referring now additionally to FIG. 1, the specific chromium isotope atoms 22 that enter the waste recycling conduit 14 are fed back into the atomic beam 44 at an aperture 100 of the isotope ion pump and optics manifold 28.

The method of the present invention functionally exploits the interaction of the Lorenz forces of a light field or fields 101, where each light field 101 is a component of the photonic lens 82, with the dipole moment of the target atoms 22. The Lorenz force is employed via the means of carefully prepared and computer generated holographic optical elements, HOE, 72 used in conjunction with both standard and adaptive optics. The HOE 72 is depended upon to generate a plurality of Lorenz field geometries which in turn will direct the atoms 22 to a predetermined nanostructure construction site 102. Additional diffractive elements, including elements of mechanical and/or photonic natures, are used in certain alternate preferred embodiments of the present invention to guide the atomic deposition beam 56 to the nanostructure construction site 102.

The precision of the HOE 72 is paramount to the efficacy of the present invention. The photonic lens 82 is composed of one or more light fields 101, where all critical parameters of each light field 101, i.e. amplitude, phase, polarization, λ, ω, as well as x, y, z dimensions and x, y, z locations, are generated with sufficient precision to allow nano-structures and nano-features to be laid down on the silicon wafer 62 within the required accuracies.

Several equations that describe the key relationships and interactions depended upon by the method of the invention are as follows:

Equation 1. The Atomic Dipole Force Potential is given as:

$$U=\hbar\Delta/2ln(1+p)$$

Where $\hbar$=Planks constant/2π

Δ=Difference in frequency between the Laser and the atomic resonance p=saturation parameter Equation 2. The saturation parameter p is given as:

$$p=I/I_O\Gamma^2/\Gamma^2+4\Delta^2$$

Where

I=Laser intensity $I_O$=Atomic Saturation Intensity

Γ=Natural Atomic Resonance Linewidth

Equation 3. In the standing wave:

$$\text{I is proportional to } SIN^2\,(2\pi x/\lambda)$$

Where

λ=wavelength of the laser x=position along the standing wave

Equation 4. The optical diffraction limit for a focused Gaussian wavefront using the Rayleigh Criterion is given by:

$$d=0.61\lambda/N.A.$$

where

λ=operational wavelength

N.A.=Numerical Aperture of the imaging optic d=diameter of the spot size

Replacing λ in the above equation with the deBroglie wavelength $\lambda_{db}$ will yield the diffraction limit of the atomic beam focus.

Equation 5. Calculating the wavelength of a chromium atom 22 we use:

$$\lambda=h/mc$$

where h is Planks constant=$6.62\times10^{-34J}{}_{-s}$ where m is the atomic mass. Here, the chromium isotope 22 is used for the calculation.

$$m=52/(6.02\times10^{23})\ (1000)\text{kg}=8.64\times10^{-26}\text{Kg}$$

where $c=3\times10^8$ m/s which yields a result of: $\lambda=2.55\times10^{-17}$ m$=2.55\times10^{-8}$ nm.

Thus, from the above calculation, we can see that, in effect, there is no wavelength dependent diffraction limit in the atomic region.

Equation 6. Examining equation (4) however, we find that there is the deBroglie wavelength of the atom which needs to be figured into the calculations. The deBroglie wavelength is velocity dependent, so for this example, we use a velocity of 1 meter/second.

The deBroglie wavelength is calculated from the following:

$$\lambda_{db}=h/mv=6.62\times10^{-34}/(8.64\times10^{-26})(1)=7.662\times10^{-9}\text{m or} \approx 8\text{ nm}$$

Equation 7. At this point, we must note that we are using the Lorenz fields of the light to focus the atoms 22 and, continuing to use a specific chromium isotope as our example atom 22, the resonant wavelength of light addressing a chromium optical transition from the ($^7S_3$) ground state to the ($^7P^0{}_4$) excited state in vacuum is 425.55 nm. Substituting the calculated deBroglie wavelength into equation (4) will yield the following:

$$d=0.61\lambda_{db}/N.A.$$

Assuming that the optical systems numerical aperture approaches unity we see that:

$$d=0.61\times7.662\times10^{-9}\text{m}/1=4.6738\times10^{-9}\text{ or} \approx 5\text{nm}$$

Returning now to equations 1 through 3, we can see that there is an interactive relationship between the atomic velocity and the effect of the Lorenz forces upon the dipole moment of an atom. As the atomic velocity increases, the deBroglie wavelength decreases, thus yielding an increased resolution of the possible spot size.

Equation 8. Let us then assume that we have treated equations 1 through 3 in a balanced fashion to adjust for an increased atomic velocity, a factor of 20. We can then see that the possible resolution increases as follows:

$$\lambda_{db}=h/mv=6.62\times10^{-34}/(8.64\times10^{-26})\ (20)=6.62\times10^{-34}/1.7283^{-25}.=3.83\times10^{-10}\text{m or }0.383\text{nm}$$

Which is a result approaching the diameter of a single chromium atom 22, thus rendering the diffraction limitation of this technology into irrelevance.

Equation 9. Now for comparison let us look at the diffraction limited spot size equation for the equivalent standard lithography process. Again, we will assume a Numerical Aperture approaching unity. Taking once again equation (4) we find the following:

$$d=0.61\lambda/N.A.$$

Thus d=0.61×425.55 nm/1=259.59 nm

As is shown in this mathematical treatment of the different operational regimens, there is a 52× resolution difference between the results of equations (7) and (9) which favors using the method of the present invention, while still using visible wavelengths of light and current optical glasses. Note that deposition line widths of λ/15 have been observed. Line widths as low as or lower than λ/50 are predicted. This prediction includes diffraction errors, chromatic aberration, quantum mechanical effects, etc.

Considering the complexity of the required quantum dynamic interactions, the production and functional implementation of a HOE 72 is computationally intensive. Fortunately, the preferred embodiment of the present invention 2 provides several techniques to increase the resolution and repeatability of the resulting wavefronts.

Referring now to FIG. 2, the holographic alignment reticule/fiducial 88 interacts with the holographic element positioner 74 and deposition substrate wafer positioning system 80 under the direction of the system controller 68 to dynamically adjust and provide a fiducial locating accuracy in the nanometer or subnanometer range with real-time interferometric vibration isolation. This level of fiducial accuracy enables the system controller 68 to consistently drive the substrate carousel 96 to establish and maintain an orientation between the surface 63 of the silicon wafer 62 relative to the HOE 72 with nanometric precision in all spatial axes during the deposition process steps.

Referring now to FIG. 3A and FIG. 3B, further enhancing the useful functionality, resolution and overall performance of the fabrication reactor 10 is the usefulness of photons 103 reflected from a device nanostructure 104 under fabrication. In cases where photonic wavelengths are insufficiently small for measuring nano devices under construction. this principle may be substituted through the use of electron beam diffraction and reconstruction of a holographic image of the dimensions of the device under construction using principles similar to optical holography and image recognition. Since the data contained in the diffraction patterns 84 of a specially selected HOE 72 may describe a partial or complete 3-D map of a final structure and geometry of the deposition process being performed, likewise a reflected signal 106 may be used to provide interferometric data as to the exact status of the deposition materials with reference to some or all desired physical parameters. This may be used to provide real-time control of deposition rates and locations through servo mechanisms or may be used simply to determine a deposition process endpoint.

One possible method of control would take advantage of the analog optical computation properties of the HOE 72 by dynamically adjusting the corrective optic 70. The modulation of the corrective optic 70 would either enhance or attenuate, but is not necessarily limited to effecting, the amplitude modulation of the light fields 101 at the nanostructure construction site 102, thus controlling the deposition rates and the nanostructure geometry while enhancing the signal to noise ratio.

A single crystal silicon wafer substrate 62, standard to the industry may be used in the production of devices with the preferred embodiment 2. However, due to the precise and controlled fashion in which the quantum properties of the deposition materials are addressed and manipulated during device fabrication, vast new possibilities are available to the device designers. While this process can create sub-micron features and nanostructures with great reliability and high signal to noise ratios between devices and their surroundings, thermal management of the fabrication process of these ultra small devices is not only imperative due to scaling law effects, but through the use of the present invention is now far more attainable.

Referring now to FIG. 3A and FIG. 3B, a close-up cross-sectional view is presented of the interaction of the atomic beam 56 directed approximately perpendicularly against the surface 63 of the wafer 62. The interaction of the dipole moment of the atoms 22 is related to the time period the atoms 22 are placed in or in the vicinity of the light field 101, the simultaneous atomic velocity of the atoms 22 and the geometry and intensity of the light field 101. The time elapsed between the first encounter of the atoms 22 or any atomic deposition beam 56 of pre-specified composition with the atomic trap 108 of suitable field strength and the subsequent deposition of the atoms 22 at the active nanostructure construction site 102 is critical and must be considered by a system designer in accordance with the exact quantum and physical natures of the particular elemental or molecular species provided in the atomic deposition beam 56. For example, a time period of less than six (6) atomic lifetimes is recommended for the chromium isotope atom 22 transitions. Other suitable materials known in the art, e.g. aluminum, are used where properties of the alternate materials are useful to establish the functionality, architecture and mechanical properties of the device nanostructure 104 under construction.

Should the atom 22 absorb too many photons 103 prior to bonding at the nanostructure construction site 102 then the atom 22 will experience a shift to a higher eigen state value, which in turn will decrease the responsiveness of the atom 22 to influence and direction by the light fields 101 towards the desired nanostructure construction site 102 by means of the Lorenz force. However, so long as the residual atomic velocity and remaining time in the field 101 is not too great, additional antiresonant photons 103 should re-cool the atom 22, thus allowing the atom 22 to again be directed by the light fields 101 to the nanostructure construction site 102.

However, should this not be the case, residual atomic velocity, reactor design geometries and gravity should all interact to cause the atom 22 to eventually land away from the atomic trap 108. To minimize this, an atomic trap field 110 comprising a plurality of atomic traps 108, 112 are designed in such a way as to have sufficient overlap given the possible atomic trajectories, thus allowing any stray atoms 22 to be redirected to the next or another nanostructure construction site 114 in the path of the stray atom 22.

The retro reflecting device 105 returns a wavefront 107 which is emitted from holographic optical element 72 upon itself, thus creating the standing waves 107A, 107B which in turn create the photonic lenses 82.

Further to this, a red detuned photonic field 116 attracts the atoms 22 toward the field maxima 118 and a blue detuned field 120 attracts the atoms 22 toward the field minima 122. While these resonantly detuned fields 116, 120 are only separated by a few kilohertz to megahertz, appropriate design and overlap of the geometries of the fields 116, 120 allows a fairly high signal to noise ratio deposition null point surrounding the nanostructure construction site 102. Any stray atoms 22 escaping the atom trap 108 come under the influence of the repulsive field 120 of the blue detuned maxima, thereby lofting the atoms 22 away from the deposition surface 63, until the repulsive field 120 diminishes sufficiently for the atoms 22 to come under the influence of the Lorenz fields of the next encountered or other appropriate nanostructure construction site 114.

A 425.55 nm laser wavelength, as taught by McClelland and the NIST team in their chromium deposition work, is used as an example wavelength in this disclosure. The 425.55 nm laser wavelength addresses the chromium optical transition from the ($^7S_3$) ground state to the ($^7P^0_4$) excited state in vacuum. This transition has a natural line width of $\lambda$=5 MHz. While the ½ wavelength resolution limit between deposition features may seem to be a limitation, 38 nm full width at half maximum, or FWHM, linewidths have been observed with 8 nm feature heights. These referenced deposition properties were achieved within a matter of a few minutes. This is a direct result of the localized field strength's exertion on the atoms and their quantum excitation thresholds. To achieve higher feature densities, achieving periods far smaller than the referenced ½ periodicity or line feature separation, deposition steps may be accurately offset using beam scanning or translation of the positioning stages by appropriate distances. The fiducials 90 and other reference metrics are used for feedback and verification of spatial locations.

To achieve even smaller linewidths and device sizes, lowering the strengths of the light fields 101 may be considered. Electron beam milling or resonant ablation through precisely designed and balanced fields 116, 120 being translated over the previous deposition results may also be employed after the deposition event as appropriate. Because the method of the present invention enables the manipulation of many parameters at the quantum level, many creative solutions may be applied to device and process design.

As the ideally collimated, shaped and controlled beam of atoms 56 travels toward and/or over the silicon wafer 62, some of the atoms 22 will freeze out of the deposition beam 56 and bond to a neighboring atom 22 at the lowest possible energy state. As a benefit of this type of direct write holographic lithography process, the frequency of lattice defects is dramatically reduced due to the quantum mechanical statistical behavior of atomic bonds thus manipulated. This means that since the deposition occurs using resonantly ionized purified isotopes 22 which are then deposited at their lowest energy levels, or as close to the ground state as is feasible, the atomic bonds created via this technique are among the shortest, strongest bonds possible. Unlike bonds established at higher thermodynamic energies, which allow for bond equations to be satisfied under many circumstances and possibilities, these bonds and their resultant crystal lattice structures are the most compact possible. This means that a device nanostructure 104 fabricated at higher temperatures may have a bond to a second or third atomic neighbor or have bond mismatches due to isotope variations or other types of unplanned impurities bonded into its lattice structure. While quantum dynamics allows for these bond equations to be satisfied under those circumstances, the down side is that should a device incorporating a non-idealized bond structure experience a thermal shock or electrostatic discharge event, that event may impart sufficient energy to cause the bond to experience a quantum shift out of its preferred lattice (at least preferred by the device designer) and re-bond where the imparted energy allows it to, if at all. The net result of these random, renegade bonds is that the lattice becomes disrupted at best, or a shear force is initiated and then propagates through the system causing catastrophic device failure.

The substrate upon which the deposition is performed is maintained at as low a temperature as is reasonable given the deposition parameters. In an environment where cryogenic pumping is used to achieve the vacuum in the system, the substrate should be maintained at a temperature that is higher than that of the cryogenic pump surface area. This is will prevent unnecessary contamination of the substrate surface area.

However, due to the reduced temperature of the substrate relative to its surrounding environment, some gettering of contaminants will be inevitable. In order to prevent contaminants being incorporation on the substrate surface, the wafer surface may be irradiated using resonant laser energy immediately prior to the deposition process to remove any residual contaminants from the wafer surface. The material to be deposited is subsequently laid down on the wafer surface and, as is required by the crystalline lattice structure to be created, the material and wafer surface are irradiated with laser energy resonantly tuned to the desired lattice structure bond energy potentials.

In standard molecular beam epitaxy and physical vapor deposition technologies, the atom impinging upon the surface of the wafer may land and bounce, thereby migrating to other locations as many as a million times in a one second time period before coming to rest in its final position in the lattice.

By providing a dynamic irradiation using energy tuned to the quantum transition energy of the lattice structure, a significant amount of the atom and molecular migration is reduced, thus reducing the amount of time that it takes to establish the desired lattice structure as well as reducing the possibility of lattice errors. In addition to the reduced kinetic energy of the system as a result of cooling the substrate below the thermal activation energies which will cause bond activation potentials, the selective lattice architecture is accomplished by providing the precise quantum activation energy required for the desired lattice structure only. As we are dealing with quantum mechanical principles in the deposition process, the type of bond structures which are allowed or disallowed must observe quantum mechanical rules of behavior. An additional advantage of this quantum activation of the desired lattice structure is to reduce surface scatter and other undesirable effects which are normally found during the deposition processes using alternate technologies. These advantages will extend to the dynamic monitoring and control of the deposition processes as well as other aspects of the invention which will be evident to those skilled in the art.

Since the method of the present invention enables preferential bonding of atoms 22 to neighboring atoms 22 with relatively short, pure and low bonding energies, the resultant crystal lattice is physically compact thus requiring the highest energies to be supplied to the bonds in order to cause structural modification. The bonding of atoms 22 at lower energy levels, as taught in this description of the preferred embodiment 2, results in the fabrication of more robust device features and nanostructures 104, vis-a-vis the products of conventional art photolithography device fabrication techniques, and can endure trauma far beyond an equivalent structure fabricated at relatively high standard temperatures. Conventional, standard high temperature fabrication processes attempt to address this though annealing steps. The method of the present invention, however, obviates the need for additional annealing manufacturing steps by inventively providing a superior and alternative process.

Figure 4:
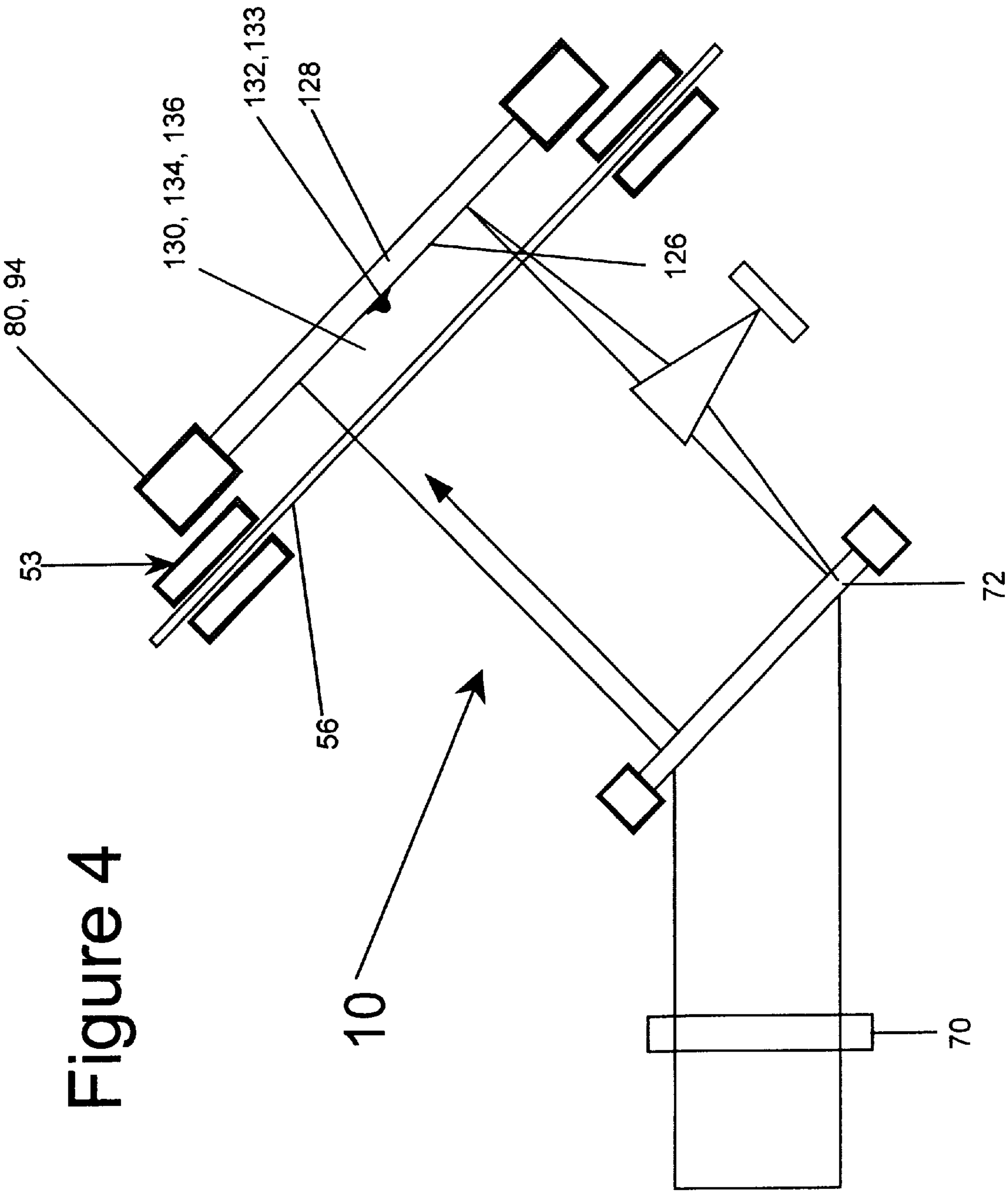
FIG. 4 presents an alternate configuration of the fabrication reactor of FIG. 1 wherein the atomic beam is focused to pass along a pathway roughly parallel to a substrate wafer.

FIG. 4 illustrates the fabrication reactor 10 of FIG. 1 configured to direct the atomic deposition beam 56 along a pathway roughly parallel to a surface 126 of a substrate wafer 128. The substrate wafer may be of amorphous crystalline structure, or a ceramic material or other suitable material known in the art. The light fields 101 of the photonic lens 130 are positioned to drive atoms 22 out of the atomic beam 56 and towards a nanostructure construction site 132 to form a device nanostructure 134.

As the atomic deposition beam 56 becomes depleted, due to redirection of the atoms 22 to the nanostructure construction site 132, the accumulation of atoms 22 into various device geometries resident on the surface 126 of the wafer 128 may begin to have d disruptive effect on the shape of the atomic deposition beam 56 or the fabrication process. In order to prevent the adverse effects of defects, contaminants and lowered device resolutions a red detuned energy field 134 and a blue detuned energy field 136 of the nanostructure construction site 132 and the deposition techniques are modulated as needed, by the system controller 68, on the basis of the dynamically acquired interferometric deposition status data. Further to this, as deposition rates and step time periods are precisely calculated, sacrificial structures may be fabricated on the wafer 128 as necessary in parallel with the current device fabrication step in order to provide dynamic physical shaping and optimization of the atomic deposition beam 56.

Figure 5A:
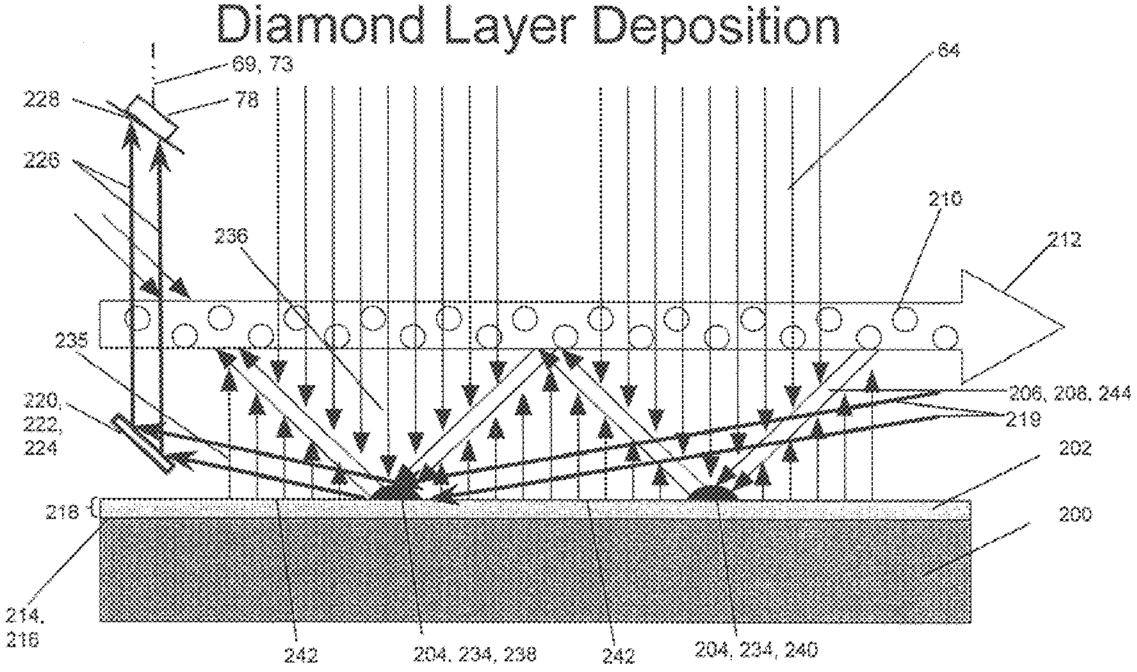
Figure 5B:
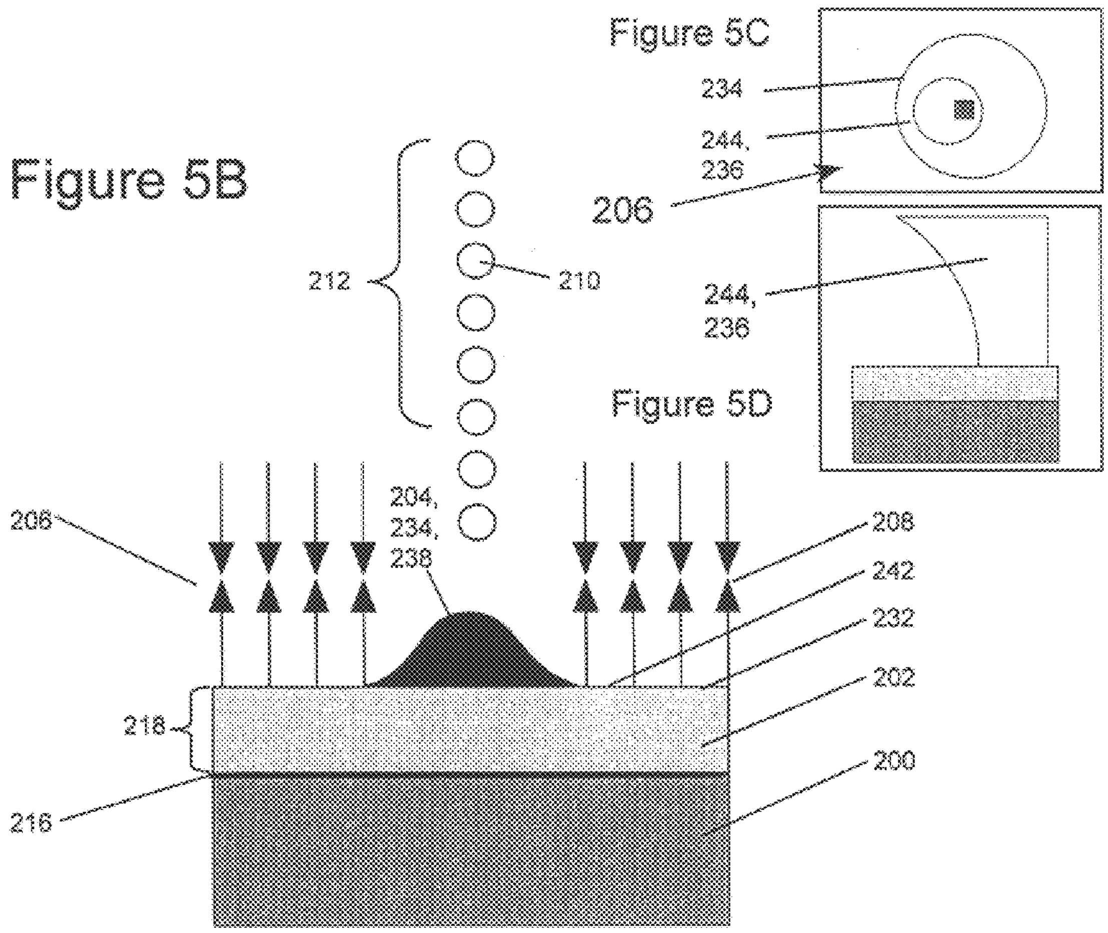
Figure 6:
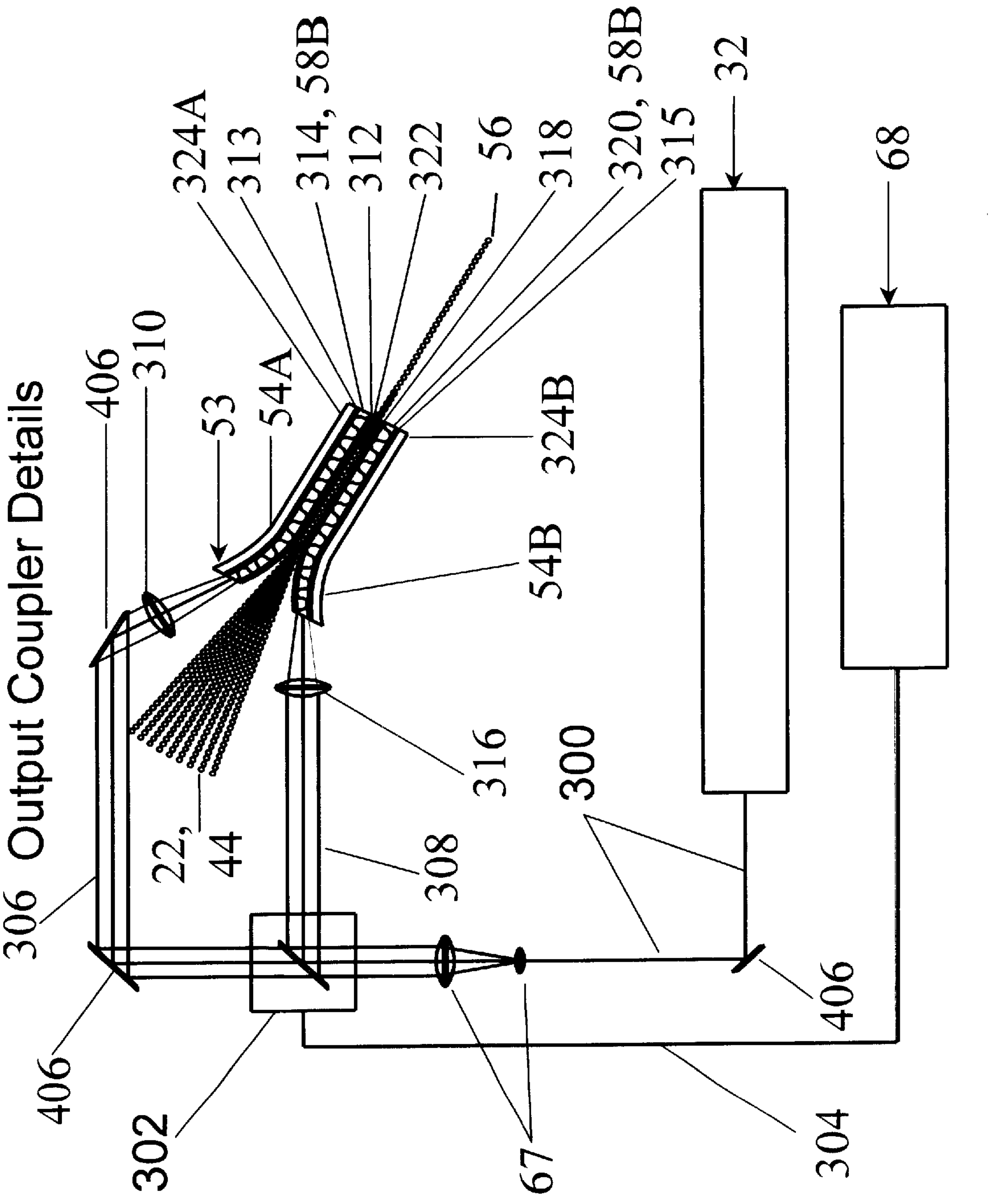
FIG. 6 is a more detailed view of the output coupler of the preferred embodiment of FIG. 1.

FIG. 5A shows a cross-sectional view of a deposition site. FIG. 5B and FIG. 5D are progressively amplified views thereof. FIG. 5C is a close-up top view of the deposition site. These Figures show a ceramic substrate wafer 200 with a $\lambda/4$ reflecting foundation layer 202, and a device feature 204 under construction and include a schematic 206 of a Lorenz field geometry relevant to depicted deposition. FIG. 6 further shows the standing wave 208 created by the interaction of the laser beam 64 with the $\lambda/4$ reflecting foundation layer 202 and the resultant Lorenz field geometry, which in turn traps a series of specific carbon isotope atoms 210 of a coherent atomic deposition beam 212. The laser beam 64 is resonantly detuned from a transition energy level of the carbon isotope atom 210.

For many years, the industry has sought to have the ability to create single crystal diamond layers in situ with well behaved results and workable lattice matching between layers. The method of the present invention now enables the manufacture of such crystal diamond layers with a degree of flatness equal to the magnitude of four diamond crystal cells, i.e. ±14.3 angstroms (1.43 nm.), or better. Such surfaces are ideal as a base for deposition of semiconductor or optoelectronic devices. However, such surfaces also find application in devices with larger feature sizes such as disc drive heads.

Wafer 200 may be selectively formed of various amorphous ceramic materials with good thermal and dielectric properties, or other suitable materials known in the art. After the ceramic substrate wafer 200 has been suitably polished and annealed, the wafer 200 is positioned within the reactor 10 where a controlled interface layer 214 of a few angstroms thickness of an intermediate lattice matching compound 216 is first deposited. By keeping the interface layer 214 as thin as possible, the loss of thermal transfer properties of a diamond layer 218 should be minimized.

Next the diamond layer 218 of a predetermined thickness is deposited on the wafer 200 and interface layer 214. The spot thickness of the diamond layer 218 will be determined by the flatness of the polished ceramic substrate wafer 200 achieved prior to the deposition process. The deposition process of the carbon atoms 210 is a finely tuned resonant process extended out to a large surface area. The thickness and flatness of the diamond layer 218 is dynamically controlled in real time through the use of electron beam interferometry using one or more grazing incidence angle beams and directions opposing each other. This technique enables full 3-D surface profiling. By using electron beam mirrors 220 which incorporate beam-modifying, diffractive surfaces 222 and electron accelerators 224, an electron resulting beam 226 may be converted to a differential signal 228, which will, in turn, control the crystal growth rate of the diamond layer 218 within sub-nanometer resolutions. This is accomplished by using an electron beam differential image 228 to directly control the transparency/reflectivity of an electro-optic modulation plate 230 placed after the output of the reference HOE 72. This results in modulating the output laser beam 64 incidence upon the nanostructure construction site 102. Thus, a manufacturer can establish an ultra precise, single crystal diamond deposition surface 232 forming a ¼ wave reflective diamond layer 218 with outstanding thermal and dielectric properties by filling in any surface voids and irregularities with carbon isotope atoms 210 to meet the desired flatness specifications. This process may be used to obviate the need for any further processing of the ceramic wafer 200 other than that required as outlined below.

The main key in the reduction/simplification/elimination of the real time interferometric deposition rate control equipment and other such servo feedback systems in the preferred embodiment of the invention 2 is to shift these feedback controlled servo-operations as aspects of the substrate fabrication process. This is achieved through depositing a highly matched lattice compound 216 relative to the diamond deposition surface 232. Certain alternate preferred embodiments of the present invention employ other suitable materials known in the art to provide a ¼ wave reflective surface functionally equivalent to the diamond deposition surface 232.

The importance of the layered design of the diamond layer 218 is not limited to thermal management or mechanical properties alone, but also benefits the efficiency of the deposition process by providing a fairly high efficiency ¼ wave reflective diamond layer 218, tuned relative to the median operational deposition $\lambda$ of the devices generating the greatest thermal loads. These are laid down first upon the diamond layer 218. By taking advantage of the reflective properties of the ¼ wave base diamond deposition surface 232, the HOE's 72 (and those of all subsequent fabrication steps) can be designed to create a self attenuation of the deposition process once the device 234 being laid down has acquired enough carbon atoms 210 to complete design construction parameters. This process is optimized where $\omega \leqq \lambda/2$ but probe beams and wave mixing or other mechanisms may also need to be applied.

Because the laser beam 64 is selectively tuned to be near resonance with the isotope atoms 210, the reflected component 235 of the beam 64 is gradually and progressively attenuated through absorption, eventually collapsing the field intensities of a laser atom trap 236, thus, in effect, terminating the atom trap 236 used to create a particular device nanostructure 238. Through appropriate design of the devices and control of the laser intensities applied, the atom trap 236 ceases directing atoms 210 towards a nanostructure construction site 238, thus allowing remaining atoms 210 in the atomic deposition beam 212 to be directed to alternate nanostructure construction sites 240. This ensures automatic self limitation of an excessive quantity of atoms 210 being deposited either on the nanostructure construction site 238 or on the surrounding substrate area 242 or other devices, not show n, with the attendant result of increasing and optimizing the signal to noise ratio of the device 234 under fabrication.

This self attenuating auto-termination of the device deposition and fabrication via a ¼ wave tuned reflector layer is repeated for all subsequent layers as necessary.

Diffraction effects caused by the devices are taken into account in the design of the HOE 72, thus allowing for some level of control over a set of fields 244, as the set of fields 244 collapses in conjunction with the ¼ wave reflections. However, this does not imply the need to lay down non-functional ¼ wave layers, but rather indicates that the choices of device materials and their design geometries should be chosen to optimally take advantage of this phenomenon and all others which can be used to modify, stabilize or collapse the standing wave potential, or atom traps 236. However, probe beams and wave mixing or other mechanisms may also need to be applied to supplement the effects of the standing wave potential traps 236.

The intentional and integral designed use of this reflective ¼ wave layer 218, in conjunction with the lithography HOE 72, to establish the necessary standing wave geometries creates high efficiency atomic traps 236 directly at the nanostructure construction sites 238, 240. As the atoms 210 have previously been lowered to almost absolute zero degrees Kelvin, their forward velocities exhibit a usable velocity range of ≈1–20 m./sec. When the atom 210 then comes within range of an electromagnetic field of the correct threshold intensity, the resonantly detuned Lorenz force traps the atoms 210, and they are shifted further towards a ground energy state. Thus, the light fields 101 which previously had sub-threshold field strengths now direct the atom 210 in an attractive manner toward the center of the atom trap 236. The atoms 210 are, at this point, further encouraged to deposit at the desired nanostructure construction site 238 through the ballistic impact of the light field 101, which moves in the direction of the wafer 200 by design.

Multiple field geometries are possible as well as numerous variations on the methods of field generation. Thus, the above description is not intended to limit the scope of the preferred embodiment of the present invention 2, but rather is provided as a logical guideline to the understanding of the present invention.

Additionally, as the direct write lithography process title signifies, many, if not all of the photoresist/acid etch steps are removed from the manufacturing process of many device types. This is a huge advantage to the entire world, not just the manufacturer due to the realization of: a significant savings in time, reduced manufacturing steps, significant linewidth reductions without x-rays and synchrotrons, reduction of possible avenues of device contamination, reduced hazards to personnel and environment from toxic acids and chemicals, reduced government monitoring, reduced toxic disposal costs, reduced insurance costs, increased yields, reduced feedstock materials impurities, increased device hardening capabilities, reduced device design restrictions through greater materials availability, reduced incidence of materials lattice mismatch and easier to manage production processes in the manufacture of opto-electronic circuits.

By taking advantage of the great flexibility made available through the method of the present invention, novel device architectures may be realized with few fabrication restrictions beyond the basic quantum mechanical functions and lattice compatibility requirements.

The unique and desirable functionality of the present invention is that the device manufacturing industries are no longer limited to only a few materials with which to build our devices. Further, device designers are no longer limited to the somewhat random bulk properties of materials fabrication of the conventional fabrication methods. As the present invention extends device fabrication control to the quantum level and applies that quantum control over large areas, material phenomenon, which previously were limited to either thin films or exotic laboratory researches and production, can now be readily manufactured in mass market quantities with high qualities. The advantages of the present invention unshackle the imagination, ingenuity and technical skills of the device designer and allow for new functional device possibilities that were previously unthinkable.

FIG. 6 is a detailed view of the output coupler 53 of the preferred embodiment of the present invention 2 of FIG. 1. As mentioned above, in the discussion of FIG. 1, the output coupler 53 performs a function in the preferred embodiment 2, on the atomic beam 44 analogous to the effect of an optical output coupler to a laser beam in a conventional art laser system.

The evanescent wave plates 54A, 54B are shaped to apply the phase and antiphase traveling evanescent waves 58A, 58B to shape the atomic beam 44 into the more closely ordered and more coherent atomic deposition beam 56 prior to the insertion of the atomic deposition beam 56 into the fabrication reactor 10.

The laser beam 300 is detuned from a transition energy frequency of the chromium isotope atoms 22 and is fed, focused, into an electro-optic modulator 302. The modulator 302 is configured in the form of a Mach-Zender Interferometer and accepts a traveling wave radio frequency signal 304 as a modulating signal. The modulator 302 thereby splits and modulates the laser beam 300 into a phase laser beam 306 and an anti-phase laser beam 308. The phase laser beam 306 is transmitted through a cylindrical lens 310 into a first thick dielectric layer 314 of the wave plate 54A. The first thin dielectric layer 312 is located on a first thick layer 314 of the wave plate 54A. A thin dielectric layer 312, a thick dielectric layer 314 and a second thin dielectric layer 313 are deposited upon a supporting substrate 324A. The anti-phase laser beam 308 is focused through a cylindrical lens 316 into a second thick dielectric layer 320 of the plate 54B. The second thin dielectric layer 318 is located on a second thick layer 320 of the alternate wave plate 54B. The thin dielectric layer 318, the thick dielectric layer 320 and the second thin dielectric layer 315 are deposited upon a second supporting substrate 324B.

The beam 306 imposes the traveling evanescent wave 58A into a gap 322 between the plates 54A, 54B and the anti-phase beam 308 imposes the second traveling evanescent wave 58B into the gap 322. The net effect of the interactions of the two traveling evanescent waves 58A, 58B with the atomic beam 44 is to transform the atomic beam 44 into the more coherent atomic deposition beam 56.

Figure 7:
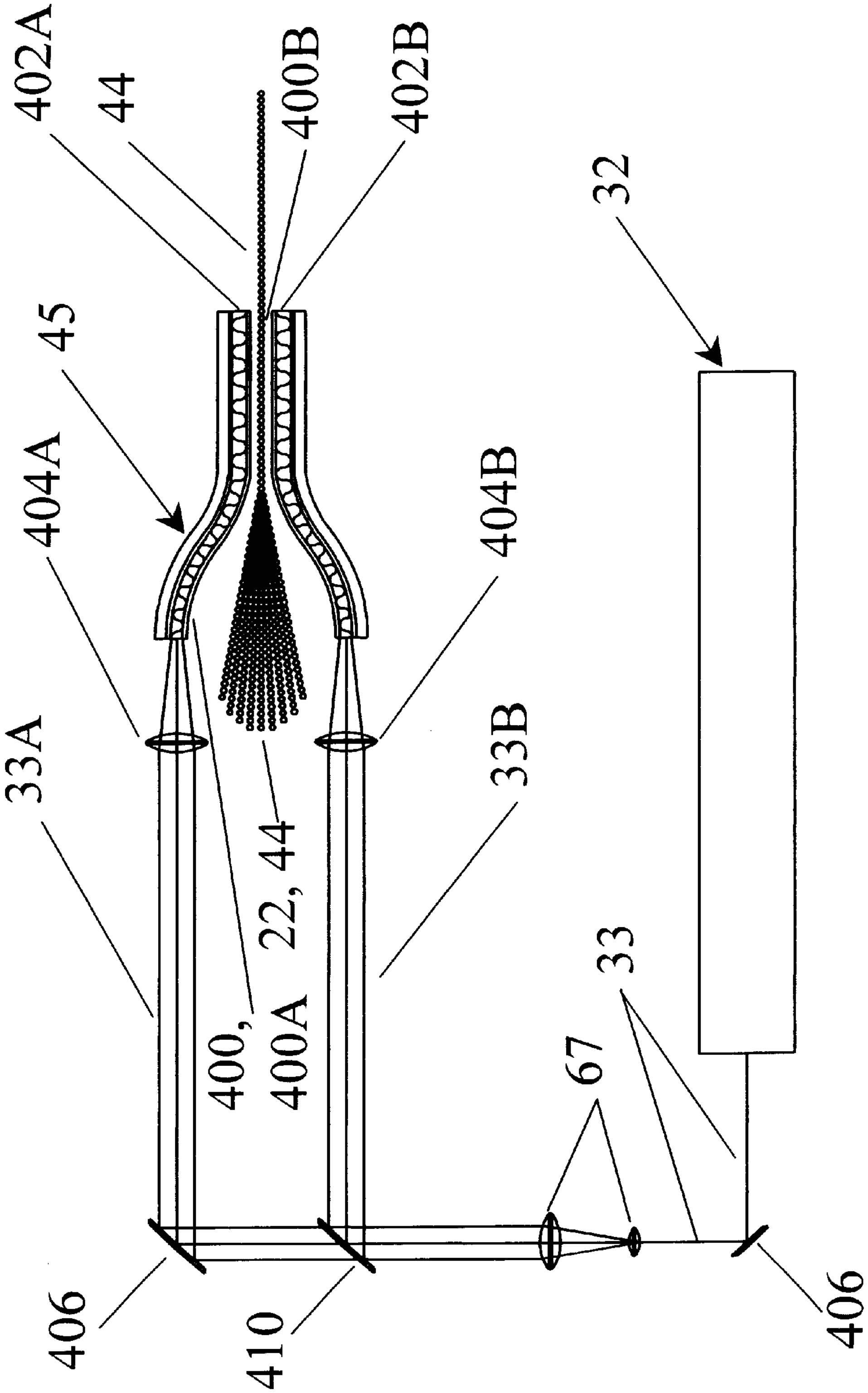
FIG. 7 is a more detailed view of the grazing incidence nozzle of the preferred embodiment of FIG. 1.

FIG. 7 is a detailed view of the grazing incidence nozzle 45 of the preferred embodiment of the present invention 2 of FIG. 1. The grazing incidence nozzle 45 is designed to improve the collimation of the atomic beam 44. It is especially valuable to execute this improvement immediately after the atomic beam 44 has been de-ionized by electron addition, as this de-ionizing action will typically reduce the degree of collimation of the atomic beam 44.

The rules of designing and shaping grazing incidence nozzles to increase the collimation of a light beam are well known in the art of deep ultraviolet and x-ray imaging. The method of the present invention inventively applies the abstract concepts of grazing incidence nozzle design to atomic beam shaping. An internal wall 400, a wide intake orifice 400A and a narrow outflow aperture 400B of the grazing incidence nozzle 45 are shaped and oriented to ballistically encourage the atoms 22 of the atomic beam 44 into a higher degree of collimation. The evanescent waves 402A and 402B act as an atomic mirror, as per Kaiser et al, and repel the atoms 22 from the walls 400 and thereby limit the contamination of the walls 400 with the chromium atoms. The evanescent waves 402A, 402B are produced by means similar to those described above in reference to the traveling evanescent waves 58A, 58B of the output coupler 53, by introducing laser beams 33A, 33B, split via a beam splitter 410 from a source laser beam 33 produced from the tunable laser 32, through a pair of cylindrical focusing lenses 404A and 404B into a thick layer of a dielectric material, whereby the two evanescent waves 402A, 402B are formed and act as an atomic mirror. Optical elements 67 and optical mirrors 406 are provided for conditioning and steering of the laser beams 33, 33A, 33B so that the laser beam 33, 33A, 33B may be turned and focused as described above through a set of cylindrical focusing optics 404A and 404B.

While the present invention has been described herein with reference to particular embodiments thereof, a latitude of modifications, various changes and substitutions are intended in the disclosure, and it will be appreciated that in some instances some features of the invention will be employed without a corresponding use of other features without departing from the scope of the invention as set forth.

Those skilled in the art will appreciate that various adaptations and modifications of the preferred embodiment can be configured without departing from the scope and spirit of the invention. Therefore, it is to be understood that, within the scope of the appended claims, the invention may be practiced other than as specifically described herein.

I claim:

1. A method of direct write fabrication of a structure on a substrate, the method comprising:

recording a holographic pattern into a holographic lens;

generating a photonic lens by focusing a light beam through said holographic pattern on said holographic lens, whereby said holographic pattern diffract, said light beam to cause formation of geometrically stable holographic light fields and thereby establish said photonic lens; and passing a particle beam through said photonic lens, wherein Lorenz field interactions between particles of said particle beam and said holographic light fields of said photonic lens affect a direction of movement of a multiplicity of said particles and whereby a portion of said multiplicity of particles are focused towards a structure construction site located on the substrate.

2. The method of claim 1 wherein said particle beam comprises a substantively homogeneous stream of atoms.

3. The method of claim 1 wherein said particle beam comprises a substantively homogeneous stream of molecules.

4. The method of claim 1 wherein said particle beam comprises a substantively isotopically homogeneous stream of atoms.

5. The method of claim 1 wherein said particle beam comprises a substantively isotopically homogeneous stream of molecules.

6. The method of claim 1 wherein said particle beam substantively comprises atoms of a particular elemental isotope.

7. The method of claim 1 wherein said particle beam substantively comprises molecules of a particular molecular isotope.

8. The method of claim 1, further comprising the steps of:

mathematically modeling the structure to be built on the substrate;

selecting particles that will be used to construct the structure;

determining a vector, energy state and pathway of said particle beam at the time said particle beam passes through said photonic lens;

back calculating a holographic pattern of said photonic lens that will direct, by means of Lorenz force interaction, said particles of said particle beam to form the structure on the substrate;

back calculating at least one laser frequency required to generate said photonic lens;

back calculating at least one holographic pattern of said holographic lens required to generate said photonic lens;

writing at least one back calculated holographic pattern into said holographic lens; and positioning said holographic lens and at least one laser source in relationship to the substrate and said particle beam whereby said photonic lens is formed in proper orientation to said particle beam and the substrate in order to direct said particle beam to build the structure.

9. The method of claim 8 wherein said particle is an isotopically specific atom.

10. The method of claim 8 wherein said particle is an isotopically specific molecule.

11. The method of claim 1, further comprising collimating said particle beam by:

forming a grazing incidence nozzle, said nozzle comprising an internal surface, a wide intake orifice and a narrow outflow aperture; and directing said particle beam through said intake orifice and towards said outflow aperture, whereby some of the individual particles of the particle beam ballistically strike said internal surface and the trajectories of said particles are thereby modified to increase the degree of collimation of said particle beam.

12. The method of claim 11, further comprising the step of generating evanescent waves proximate to said internal surface of said grazing incidence nozzle, whereby said evanescent waves act as a particle mirror and repel said individual particles away from said internal surface and contamination of said internal surface is thereby reduced.

13. The method of claim 12, wherein said evanescent waves are formed by passing at least two laser beams through at least one thin dielectric layer located proximate to said internal surface.

14. The method of claim 11 wherein said particle is an isotopically specific atom.

15. The method of claim 11 wherein said particle is an isotopically specific molecule.

16. The method of claim 11 further comprising passing the collimated particle beam from said outflow aperture of said grazing incidence nozzle through an optical molasses region prior to passing said particle beam through said photonic lens.

17. The method of claim 16 further comprising passing the particle beam from said optical molasses region through an output coupler comprising a pair of tuned traveling/evanescent wave plates prior to passing said particle beam through said photonic lens.

18. The method of claim 1 further comprising passing said particle beam through an optical molasses region prior to passing said particle beam through said photonic lens.

19. The method of claim 1 further comprising passing said particle beam through an output coupler comprising a pair of tuned traveling/evanescent wave plates prior to passing said particle beam through said photonic lens.

* * * * *